(12) United States Patent
Kitahara et al.

(10) Patent No.: US 10,171,874 B2
(45) Date of Patent: Jan. 1, 2019

(54) RECEIVING DEVICE, RECEIVING METHOD, AND PROGRAM

(71) Applicant: Saturn Licensing LLC, New York, NY (US)

(72) Inventors: Jun Kitahara, Saitama (JP); Naohisa Kitazato, Tokyo (JP); Yoshiharu Dewa, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/427,494

(22) Filed: Feb. 8, 2017

(65) Prior Publication Data

US 2017/0214971 A1 Jul. 27, 2017

Related U.S. Application Data

(63) Continuation of application No. 13/220,231, filed on Aug. 29, 2011, now Pat. No. 9,596,511.

(Continued)

(51) Int. Cl.
*H04N 21/462* (2011.01)
*H04N 21/435* (2011.01)
(Continued)

(52) U.S. Cl.
CPC ........ *H04N 21/4622* (2013.01); *H04H 20/93* (2013.01); *H04H 60/73* (2013.01);
(Continued)

(58) Field of Classification Search
None
See application file for complete search history.

(56) References Cited

U.S. PATENT DOCUMENTS 6,571,392 B1 5/2003 Zigmond et al.
7,028,327 B1 4/2006 Dougherty et al.
(Continued)

FOREIGN PATENT DOCUMENTS

EP 1 343 325 9/2003
EP 2 034 727 3/2009
(Continued)

OTHER PUBLICATIONS

"Hybrid Broadcast Broadband TV" ETSI TS 102 796 V1.1.1, Jun. 2010, XP055148388, 75 pages.
(Continued)

*Primary Examiner* — Hsiungfei Peng
(74) *Attorney, Agent, or Firm* — Oblon, McClelland, Maier & Neustadt, L.L.P.

(57) ABSTRACT

Disclosed herein is a receiving device for receiving an AV content broadcast by a broadcasting wave, including: an obtaining section adapted to obtain a description document described in a predetermined computer language for displaying another content different from the AV content; a determining section adapted to determine whether the obtained description document is managed by a broadcaster which broadcasts the AV content or is managed by a different operator other than the broadcaster; and a controlling section adapted to control execution of the obtained description document in response to a result of the determination by the determining section.

18 Claims, 23 Drawing Sheets

Related U.S. Application Data

(60) Provisional application No. 61/515,107, filed on Aug. 4, 2011, provisional application No. 61/378,277, filed on Aug. 30, 2010.

(51) Int. Cl.

| | | |
|---|---|---|
| *H04N 21/61* | (2011.01) | |
| *H04H 20/82* | (2008.01) | |
| *H04H 20/93* | (2008.01) | |
| *H04N 21/434* | (2011.01) | |
| *H04N 21/478* | (2011.01) | |
| *H04N 21/6543* | (2011.01) | |
| *H04H 60/73* | (2008.01) | |
| *H04H 60/82* | (2008.01) | |
| *H04N 21/643* | (2011.01) | |
| *H04N 21/482* | (2011.01) | |

(52) U.S. Cl.
CPC .......... *H04H 60/82* (2013.01); *H04N 21/435* (2013.01); *H04N 21/4349* (2013.01); *H04N 21/478* (2013.01); *H04N 21/6125* (2013.01); *H04N 21/6175* (2013.01); *H04N 21/643* (2013.01); *H04N 21/6543* (2013.01); *H04N 21/4821* (2013.01)

(56) References Cited

U.S. PATENT DOCUMENTS

| | | | | |
|---|---|---|---|---|
| 2003/0099459 | A1 | 5/2003 | Yanagita et al. | |
| 2004/0028079 | A1 | 2/2004 | Van Noetsele | |
| 2008/0205847 | A1 | 8/2008 | Yanagita et al. | |
| 2008/0259208 | A1 | 10/2008 | Yanagita et al. | |
| 2008/0297379 | A1* | 12/2008 | Yang | H03M 7/30 341/50 |
| 2009/0070540 | A1* | 3/2009 | Dewa | H04H 60/73 711/163 |
| 2009/0131079 | A1* | 5/2009 | Sekhar | H04W 4/02 455/456.3 |
| 2009/0295989 | A1 | 12/2009 | Kang et al. | |
| 2009/0313663 | A1 | 12/2009 | Kitazato et al. | |
| 2010/0180297 | A1 | 7/2010 | Levine et al. | |
| 2011/0083154 | A1 | 4/2011 | Boersma | |
| 2011/0126249 | A1* | 5/2011 | Makhlouf | H04N 7/17318 725/109 |
| 2012/0180083 | A1 | 7/2012 | Marcus | |
| 2017/0251239 | A1* | 8/2017 | Cedervall | H04N 21/4302 |

FOREIGN PATENT DOCUMENTS

| | | |
|---|---|---|
| JP | 2001-313921 | 11/2001 |
| JP | 2003-131981 | 5/2003 |
| JP | 2003-264748 | 9/2003 |
| JP | 2004-533759 | 11/2004 |
| JP | 2006-287872 | 10/2006 |
| JP | 2007-89059 | 4/2007 |
| JP | 2007-158828 | 6/2007 |
| JP | 2009-31952 | 2/2009 |
| JP | 2009-65422 | 3/2009 |
| JP | 2010-28726 | 2/2010 |
| WO | WO 01/53966 | 7/2001 |

OTHER PUBLICATIONS

International Search Report dated Sep. 20, 2011 in Application No. PCT/JP2011/068901 (with English Translation).

Office Action dated Feb. 4, 2014 in Japanese Patent Application No. 2012-531796.

Extended European Search Report dated Feb. 17, 2014 in Patent Application No. 11821601.9.

M. Ceccarelli et al., "Home Multimedia Systems: on Personal Video Libraries," Multimedia Computing and Systems, vol. 2, XP010519568, Jun. 7, 1999, pp. 1082-1085.

International Search Report dated Nov. 15, 2011, in PCT/JP2011/068834 (with Engligh-language translation).

Office Action dated Jun. 16, 2017 in Canadian Patent Application No. 2,806,828.

\* cited by examiner

F I G . 6
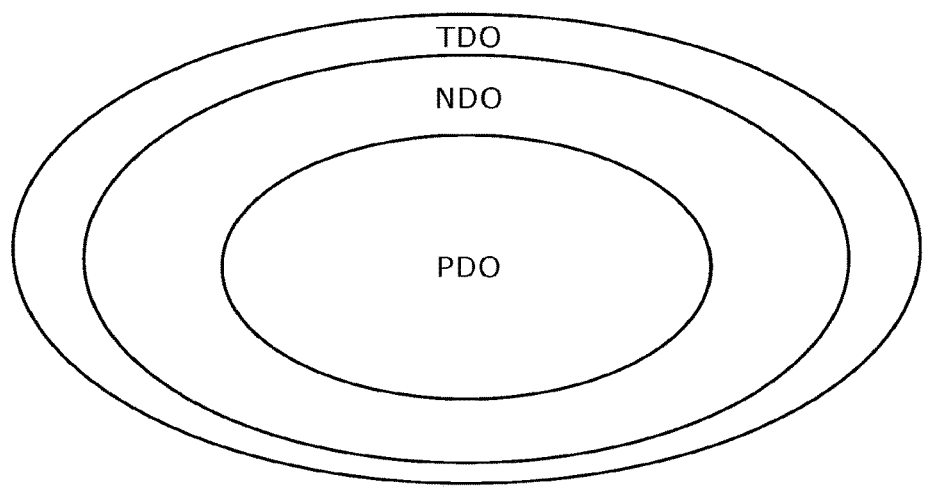

FIG.7

| Event ID | Description |
|---|---|
| A | User tunes a receiver to broadcast program of a liner TV channel. |
| B | User selects the EPG button of remote controller and then displayed EPG by native application. |
| C | User tunes a receiver to broadcast program of a NRT channel with service category "portal". |
| D | User tunes a receiver to broadcast program of a NRT channel with service category "scripted". |
| E | User selects the NRT button of remote controller and then user interface displays NRT content portal by native application. |

FIG. 8

| UI | Title | Expected next event |
|---|---|---|
| 1 | Watch broadcast program | a. Launch the TDO by receiving trigger while watching broadcast program. |
| 2 | Broadcast and TDO | b. TDO is updated when receiver receives new TDO and its trigger.<br>c. User selects the NRT content to begin playback.<br>e. User interface transit to "Browser PDO content" automatically. |
| 3 | EPG | f. User clicks a title where user wants to see the detail information, and then advanced EPG is displayed. |
| 4 | Advanced EPG | Deleted |
| 5 | Browse NDO content Advanced EPG | g. User selects PDO content.<br>m. User selects to begin playback NRT audio/video content.<br>n. User selects to reserve NRT content download or subscription of Push NRT service. |
| 6 | NRT content portal | j. User selects NDO content when watching NRT Content portal.<br>k. User selects to reserve NRT content download or Push NRT service subscription.<br>l. User selects to begin playback NRT audio/video content. |
| 7 | Playback NRT audio/video content | c. Native application transits to broadcast program and TDO when user selects to stop playback of the NRT content.<br>l. User selects to stop playback.<br>m. User selects to stop playback. |
| 8 | Reserve NRT content download | d, k, n<br>This state indicates internal function to download the NRT content in background when user selects to reserve it. |
| 9 | Subscribe push NRT service | d, k, n<br>This state indicates internal function to subscribe the Push NRT service in background when user selects to reserve it. |
| 10 | Playback NRT content and TDO | Deleted |
| 11 | Browse PDO Content | h. User selects to watch other PDO content.<br>i. User selects to watch general internet content. |
| 12 | Browse internet content | out of scope |

FIG.12

| ITEM | EXPLANATION |
|---|---|
| TRIGGER ID | INFORMATION FOR IDENTIFYING TRIGGER INFORMATION |
| TRIGGER TYPE | 4 TYPES INCLUDING APPLICATION START, APPLICATION END, APPLICATION EVENT AND PRE-CACHE |
| APPLICATION ID | INFORMATION FOR IDENTIFYING APPLICATION |
| APPLICATION TYPE | INFORMATION INDICATING APPLICATION TYPE (html java ETC.) |
| PROVIDER ID | INFORMATION IDENTIFYING PROVIDER |
| APPLICATION URL | URL OF SERVER FROM WHICH APPLICATION IS OBTAINED WHEN TRIGGER TYPE IS APPLICATION START OR PRE-CACHE |
| STORED APPLICATION ID | INFORMATION FOR IDENTIFYING DOWNLOADED APPLICATION TO BE STARTED WHEN TRIGGER TYPE IS APPLICATION START |
| AUTOMATIC START FLAG | INFORMATION INDICATING AUTOMATIC START OR MANUAL START WHEN TRIGGER TYPE IS APPLICATION START |
| APPLICATION END TIME | TIME TO END APPLICATION WHEN TRIGGER INFORMATION WHOSE TRIGGER TYPE IS APPLICATION END IS NOT RECEIVED |
| APPLICATION NAME | APPLICATION NAME PRESENTED TO USER |
| EVENT ID | INFORMATION FOR IDENTIFYING EVENT WHEN TRIGGER TYPE IS APPLICATION EVENT |

FIG. 13

```
TriggerInfo_descriptor() {
    descriptor_tag              8
    descriptor_length           8
    trigger_id                  8
    trigger_type                3       "1:app_launch, 2:app_end, 3:app_event  4 precashe
    access_randomize_value      5
    application_id              8
    application_type            4
    reserved                    4
    if(trigger_type==1) {
        auto_start_flag         1
        app_name_flag           1
        net_url_flag            1
        stored_app_flag         1
        reserved                4
        app_valid_period        8
        if(app_name_flag==1) {
            app_name_length     8
            for(i=0, i<N, i++) {
                app_name_text   8×N
            }
        }
        if(stored_app_flag==1) {
            stored_app_id       16
        if(net_url_flag==1) {
            for(i=0, i<M, i++) {
                net_url_text    8×N
            }
        if(trigger_type==2) {
            app_event_id        8
        }
    }
}
```

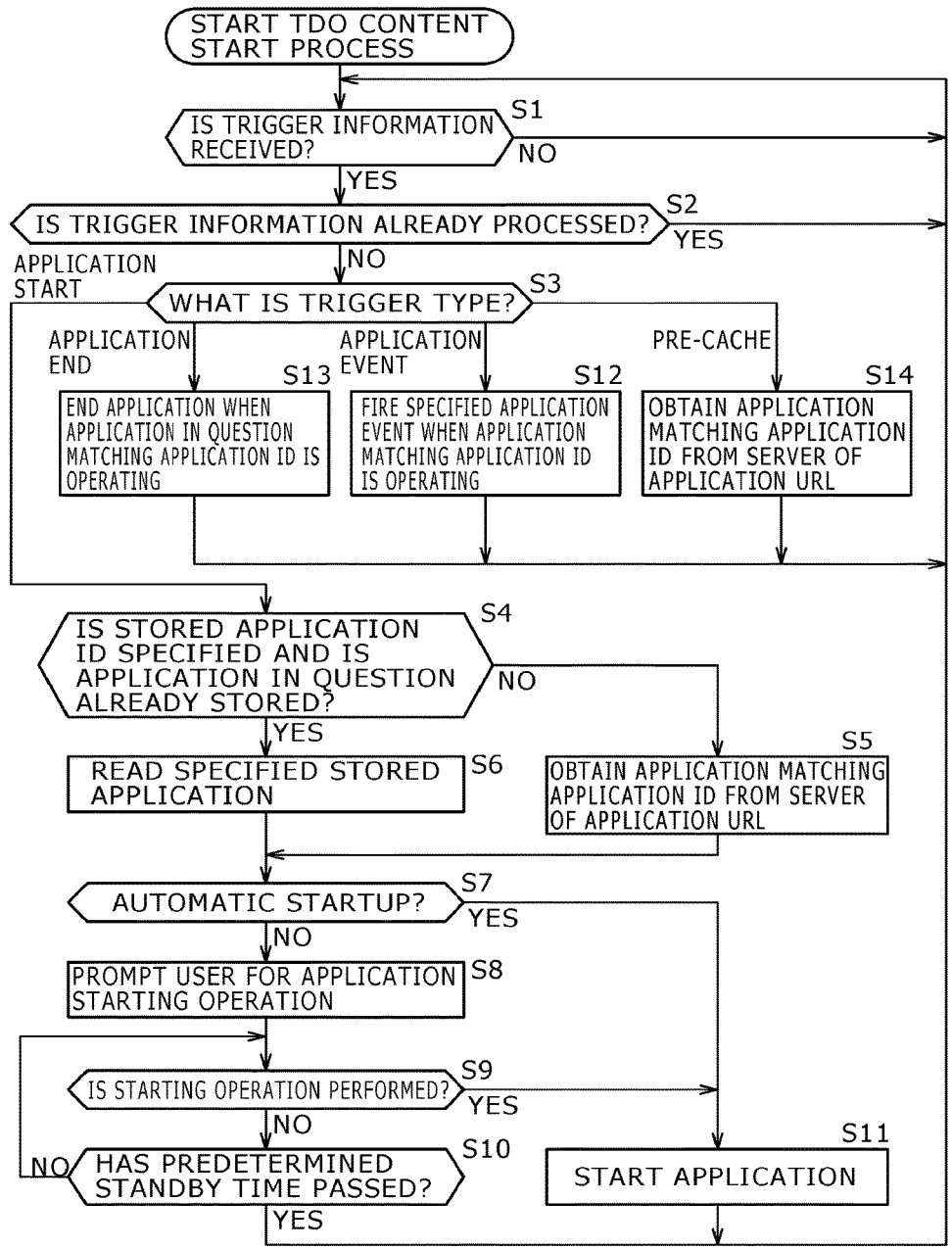

FIG.23

| ITEM | EXPLANATION |
|---|---|
| TRIGGER ID | INFORMATION FOR IDENTIFYING TRIGGER INFORMATION |
| TRIGGER TYPE | 5 TYPES INCLUDING APPLICATION START, APPLICATION END, APPLICATION EVENT, PRE-CACHE AND SUSPEND |
| APPLICATION ID | INFORMATION FOR IDENTIFYING APPLICATION |
| APPLICATION TYPE | INFORMATION INDICATING APPLICATION TYPE (html java ETC.) |
| PROVIDER ID | INFORMATION IDENTIFYING PROVIDER |
| APPLICATION URL | URL OF SERVER FROM WHICH APPLICATION IS OBTAINED WHEN TRIGGER TYPE IS APPLICATION START OR PRE-CACHE |
| STORED APPLICATION ID | INFORMATION FOR IDENTIFYING DOWNLOADED APPLICATION TO BE STARTED WHEN TRIGGER TYPE IS APPLICATION START |
| AUTOMATIC START FLAG | INFORMATION INDICATING AUTOMATIC START OR MANUAL START WHEN TRIGGER TYPE IS APPLICATION START |
| APPLICATION END TIME | TIME TO END APPLICATION WHEN TRIGGER INFORMATION WHOSE TRIGGER TYPE IS APPLICATION END IS NOT RECEIVED |
| APPLICATION NAME | APPLICATION NAME PRESENTED TO USER |
| EVENT ID | INFORMATION FOR IDENTIFYING EVENT WHEN TRIGGER TYPE IS APPLICATION EVENT |

RECEIVING DEVICE, RECEIVING METHOD, AND PROGRAM

CROSS-REFERENCE TO RELATED APPLICATION

This application is a continuation application of U.S. patent application Ser. No. 13/220,231, filed Aug. 29, 2011, which claims the benefit of priority of Provisional Application Ser. Nos. 61/378,277, filed Aug. 30, 2010 and 61/515,107, filed Aug. 4, 2011, the entire contents of which are incorporated herein by reference.

BACKGROUND

The present technology relates to a receiving device, a receiving method, and a program, and particularly to a receiving device, a receiving method, and a program, suitable for use in executing contents different from AV contents corresponding to a so-called program in digital television broadcasting, for example.

In Japan, the digitization of television broadcasting has been promoted, and terrestrial digital broadcasting, BS digital broadcasting and the like have been spread. In addition, in digital television broadcasting such as terrestrial digital broadcasting, not only broadcasting of AV contents corresponding to a so-called program but also data broadcasting using BML (Broadcast Markup Language) have been realized (see Japanese Patent Laid-Open No. 2003-131981, for example).

A television receiver receiving data broadcasts can for example display information related to a program being broadcast, display information unrelated to the program being broadcast (a notice of another program, news, a weather forecast, traffic information and the like), and execute an application program interlocked with the program (AV contents) being broadcast.

In addition, the above-described television receiver is configured to behave differently in a case of realizing service managed on a broadcaster side performing digital television broadcasting (for example the service of displaying a weather forecast by data broadcasting) and a case of realizing service not managed on the broadcaster side (for example the service of being connected to the Internet and displaying a home page or the like).

Specifically, when a weather forecast is displayed in data broadcasting as service managed on the broadcaster side, for example, a reading process for reading area information indicating a place of residence of a user which area information is already registered in the television receiver is performed to display the weather forecast corresponding to the place of residence of the user.

On the other hand, when connection to the Internet is established and a home page or the like is displayed as service not managed on the broadcaster side, for example, the above-described reading process or the like is not allowed to be performed so as to prevent processes unintended by the user (area information is illegally read and notified to a malicious third party, for example) from being performed.

Also in Europe, broadcasting corresponding to data broadcasting in Japan has been realized by DVB-MHP (digital video broadcasting-multimedia home platform), which defines description, a distributing system of data broadcasting contents and the like.

SUMMARY

Digital television broadcasting in the U.S. is expected to realize service corresponding to data broadcasting in digital television broadcasting in Japan by obtaining an HTML document described in HTML (Hyper Text Markup Language) from a server managed on a broadcaster side and executing the HTML document in ATSC (Advanced Television Systems Committee) 2.0.

If service is realized by using an application program composed of resources representing video, audio, still images and the like (corresponding to MPEG, MP3, and JPEG in FIG. 1) and a script (execution code) referring to the resources and performing a predetermined process as shown in FIG. 1, an operation mode can be set for each application program, and a specific process such as a reading process or the like can be allowed (or limited) according to the set operation mode.

Specifically, for example, an operation mode allowing (not limiting) performance of the specific process is set for an application program obtained from a server managed by a broadcaster. Then, it suffices to set an operation mode not allowing (limiting) performance of the specific process for an application program obtained from a server on the Internet which server is not managed by the broadcaster.

Incidentally, the application program as shown in FIG. 1 includes for example an application program created in Java language or the like and composed of a plurality of class files (script) and resources (video, audio, still images and the like) of a file structure referred to as jar.

When an application program is composed of resources and a script as shown in FIG. 1, there is a clear boundary between application programs. Therefore an operation mode can be set for each application program to allow (or limit) a specific process (reading process or the like).

When an HTML document planned in digital television broadcasting in the U.S. is used, on the other hand, the setting of an operation mode as in the case of the application program shown in FIG. 1 cannot be made.

Specifically, for example, when service is realized by using an HTML document, a transition is sequentially made to HTML documents to be executed, and each HTML document is executed independently, instead of one application program being executed as shown in FIG. 1.

It is therefore not possible to treat each HTML document executed independently when realizing service as one application program and set an operation mode.

Thus, when the HTML document planned in the U.S. is used, it is not possible to allow (or limit) a specific process according to an operation mode, and a process unintended by a user may occur.

The present technology has been made in view of such a situation. It is desirable to prevent a process unintended by a user from being performed even when service for data broadcasting is realized through document transitions.

A receiving device for receiving an AV content broadcast by a broadcasting wave according to one mode of the present technology includes:

an obtaining section adapted to obtain a description document described in a predetermined computer language for displaying another content different from the AV content;

a determining section adapted to determine whether the obtained description document is managed by a broadcaster which broadcasts the AV content or is managed by a different operator other than the broadcaster; and a controlling section adapted to control execution of the obtained description document in response to a result of the determination by the determining section.

The receiving device further includes:

a trigger detecting section adapted to detect trigger information relating to control of the description document transmitted together with the AV content and executed in an interlocked relationship with the progress of the AV content; and wherein the obtaining section obtains the description document from an information processing device managed by the broadcaster based on the detected trigger information, and the determining section determines that the description document obtained from the information processing device is managed by the broadcaster.

The obtaining section obtains, when a description document which can be executed solely without interlocking with the AV content, the description document from an information processing device managed by the broadcaster, and the determining section determines that the description document obtained from the information processing device is managed by the broadcaster.

The obtaining section obtains, when a description document which can be executed only by a specific application program, the description document from a different information processing device managed by the different operator, and the determining section determines that the description document obtained from the different information processing device is managed by the different operator.

The receiving device further includes:

an executing section adapted to execute the obtained description document, and the controlling section controls, when it is determined that the description document is managed by the broadcaster, the executing section to operate in a first management mode in which the executing section can perform a specific process determined in advance, but controls, if it is determined that the description document is managed by the different operator, the executing section to operate in a second management mode in which the executing section cannot perform the specific process.

The determining section determines, when the executing section operates in the first management mode, every time the description document is obtained, whether the obtained description document is managed by the broadcaster or the different operator, and the controlling section controls, when it is determined that the description document is managed by the different operator, the executing section, which is operating in the first management mode, to operate in the second management mode.

The controlling section controls, when a predetermined operation is performed while the executing section is operating in the second management mode, the executing section, which is operating in the second management mode, to operate in the first management mode.

The obtaining section obtains the description document transmitted utilizing a predetermined broadcasting waveband of a digital television broadcasting signal of the broadcasting wave.

The receiving device may be an independent device, or an internal block configuring a device.

A receiving method and a program according to another mode of the present technology correspond to the receiving device according to one mode of the present technology.

With the receiving device, receiving method and program according to the modes of the present technology, a description document described in a predetermined computer language for displaying another content different from an AV content broadcast by a broadcasting wave is obtained, and whether the obtained description document is managed by a broadcaster which broadcasts the AV content or is managed by a different operator other than the broadcaster is determined, and execution of the obtained description document in response to a result of the determination is controlled.

According to the present technology, it is possible to prevent a process unintended by a user from being performed even when service for data broadcasting is realized through document transitions.

BRIEF DESCRIPTION OF THE DRAWINGS

FIG. 6 is a view showing details of DOs;

FIG. 7 is a view showing details of events;

FIG. 8 is a view showing a relationship between screen transitions and events;

FIG. 12 is a view showing an example of information items included in trigger information;

FIG. 13 is a view showing an example of syntax of trigger information;

FIG. 14 is a flowchart for explaining a TDO content starting process;

FIG. 23 is another view showing an example of information items included in trigger information.

DETAILED DESCRIPTION OF THE PREFERRED EMBODIMENT

1. Embodiment

[Example of Configuration of Broadcasting System]

Figure 1:
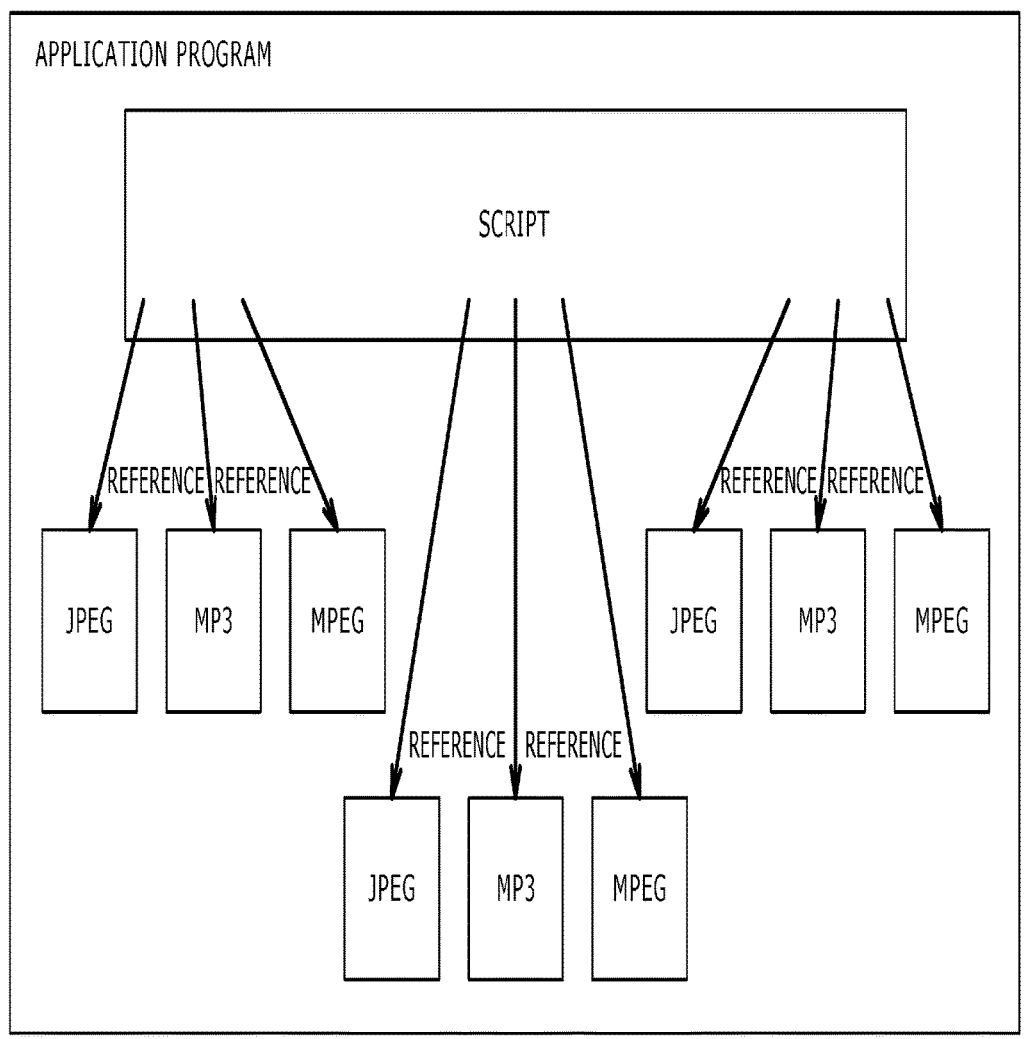
FIG. 1 is a view illustrating an example of an application program configured from a resource and a script.
Figure 2:
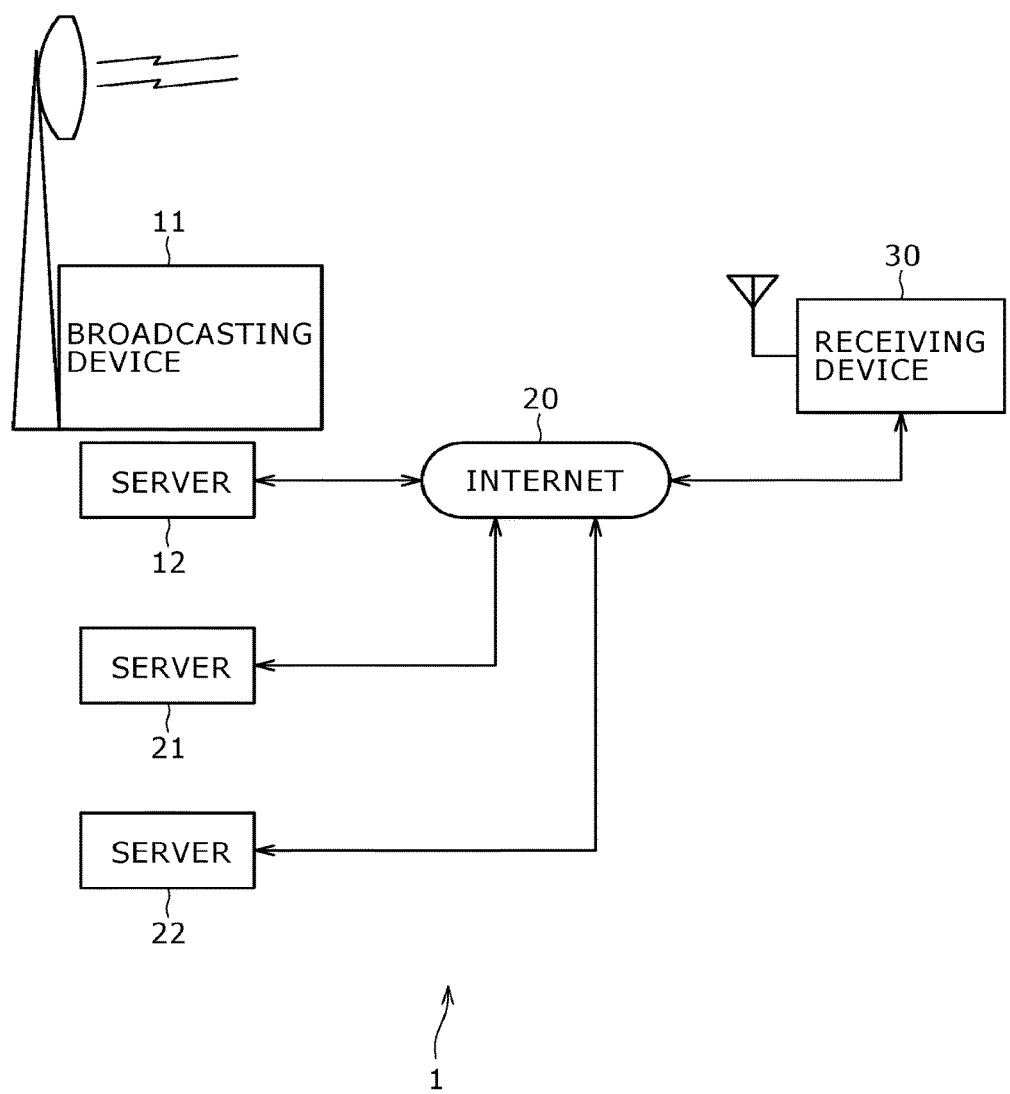
FIG. 2 is a block diagram showing an example of a broadcasting system according to an embodiment.

FIG. 2 shows a broadcasting system 1 according to the present embodiment. The broadcasting system 1 includes a broadcasting device 11, a server 12, another server 21, a further server 22 and a receiving device 30. It is to be noted that the broadcasting device 11 and the server 12 are provided on a broadcaster side, and the server 21 and the server 22 are provided on another provider side different from the broadcaster. Further, the receiving device 30 is provided on a receiver side.

It is to be noted that the server 12, server 21, server 22 and receiving device 30 are connected to each other through the Internet 20.

The broadcasting device 11 transmits (broadcasts) a digital television broadcast signal. Suppose that the broadcasting band of the digital television broadcast signal is occupied by a band for video, a band for audio, and a band for control information, and that no band for transmitting contents for data broadcasting is provided.

In addition, in predetermined timing, the broadcasting device 11 stores and transmits trigger information in a packet including PRC (Program Clock Reference) (which packet will hereinafter be referred to as a PCR packet) among TS (Transport Stream) packets forming a TS of the digital television broadcast signal.

The trigger information in this case is composed of information indicating timing of execution of a data broadcasting HTML document representing an HTML document to be executed to realize service for data broadcasting, information indicating a destination from which to obtain the data broadcasting HTML document, and the like. Details of the trigger information will be described later with reference to FIGS. 10 to 13.

The server 12 is a server managed on the broadcaster side and stores data broadcasting HTML documents licensed from the broadcaster. The server 12 supplies a data broadcasting HTML document or the like stored therein in accordance with a request from the receiving device 30 accessing the server 12 via the Internet 20.

The server 21 is a server not managed on the broadcaster side which manages the server 12 and stores data broadcasting HTML documents not licensed from the broadcaster. The server 21 supplies a data broadcasting HTML document or the like stored therein in accordance with a request from the receiving device 30 accessing the server 21 via the Internet 20.

The server 22 is a server which provides a web site to a terminal device connected to the Internet 20 and is a server not managed on the broadcaster side which manages the server 12. The server 22 provides a homepage HTML document or the like in accordance with a request from the receiving device 30 accessing the server 22 via the Internet 20.

In particular, the server 21 and the server 22 are managed by provides other than the broadcaster which manages the server 12.

The receiving device 30 receives a digital television broadcast signal transmitted from the broadcasting device 11, and obtains the video and audio of an AV content corresponding to a television program. The receiving device 30 outputs the obtained video to a monitor (for example, a monitor 31 of FIG. 3 hereinafter described) and outputs the audio to a speaker (not shown).

Figure 3:
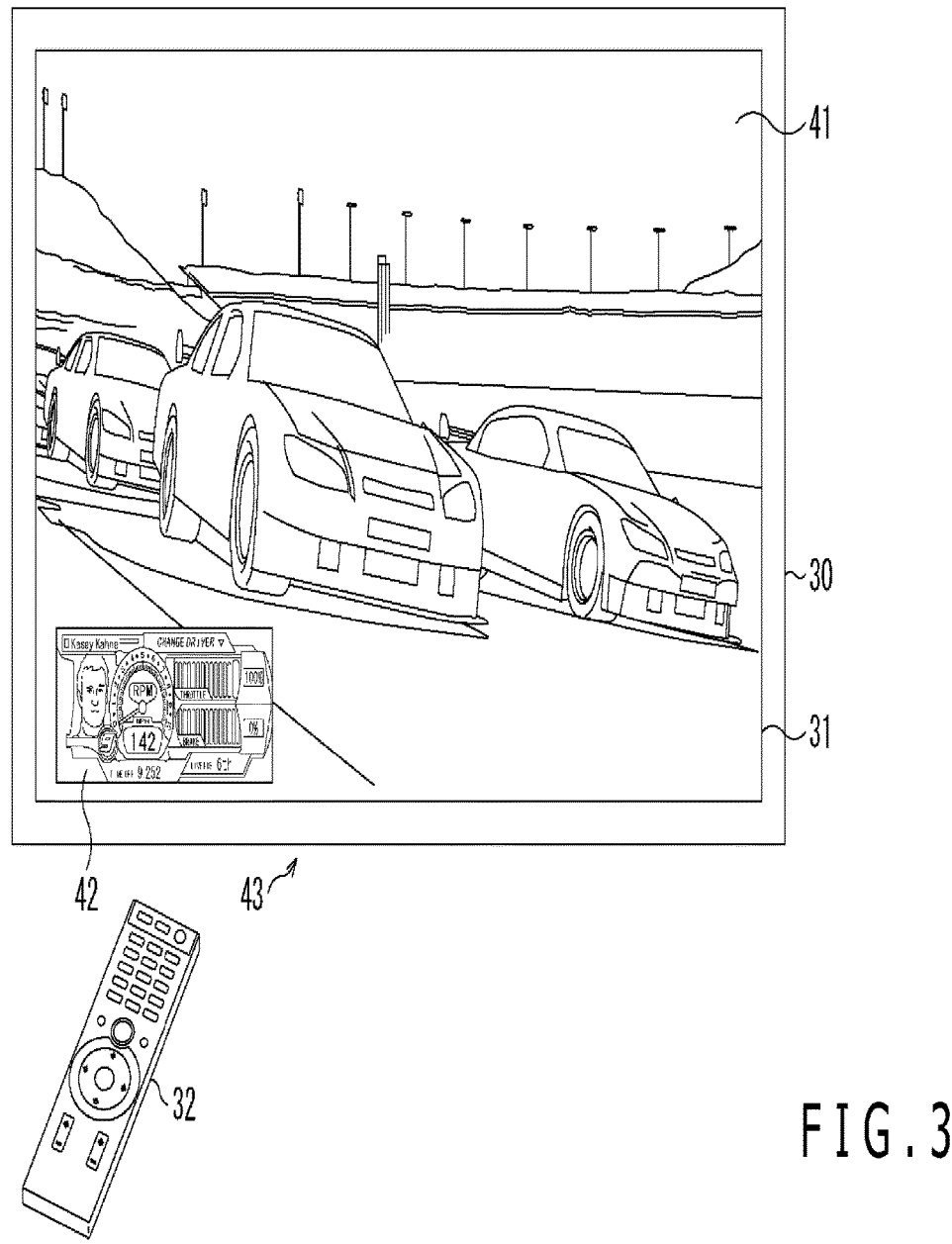
FIG. 3 is a view showing an example of display of a screen displayed on a monitor by a receiving device.

Further, the receiving device 30 accesses the server 12 or the server 21 via the Internet 20, and obtains and executes a data broadcasting HTML document. Thereby, as shown in FIG. 3, the receiving device 30 displays video 43 obtained by superimposing the video 42 of the data broadcasting content on the video 41 of the AV content on the monitor 31. It is to be noted that the receiving device 30 can be remotely operated from a remote position by using a remote controller 32.

Referring back to FIG. 2, the receiving device 30 further accesses the server 22 via the Internet 20 and obtains and executes a homepage HTML document.

Incidentally, the receiving device 30 may be present as a discrete unit, or may be built into a television receiver or a video recorder, for example. A detailed configuration of the receiving device 30 will be described later with reference to FIG. 9.

The broadcasting system 1 is configured in such a manner as described above.

[Managing Method of Written Document]

Next, a managing method of a written document in the present technology is described with reference to FIGS. 4 to 8.

A point of the present technology is that a specific process realized by the execution of an HTML document is permitted or limited depending upon whether the HTML document obtained via the Internet 20 and executed in the receiving device 30 is managed on the broadcaster or some other provider.

Specifically, for example, when the receiving device 30 executes an HTML document managed on the broadcaster side such as, for example, a data broadcasting HTML document obtained from the server 12 provided on the broadcaster side, the performance of a specific process by the HTML document is permitted (not limited).

Conversely, when the receiving device 30 executes an HTML document not managed on the broadcaster side such as, for example, a data broadcasting HTML document obtained from the server 21 provided on the different provider side or a homepage HTML document obtained from the server 22, the performance of a specific process by the HTML document is not permitted (is limited).

The management of HTML documents is performed in such a manner as described above by the receiving device 30. It is to be noted that an HTML document is an example of a written document described in a predetermined computer language for causing another content different from an AV content such as a program to be displayed, and the written document is not limited to this but also it is possible to use another written document.

Figure 4:
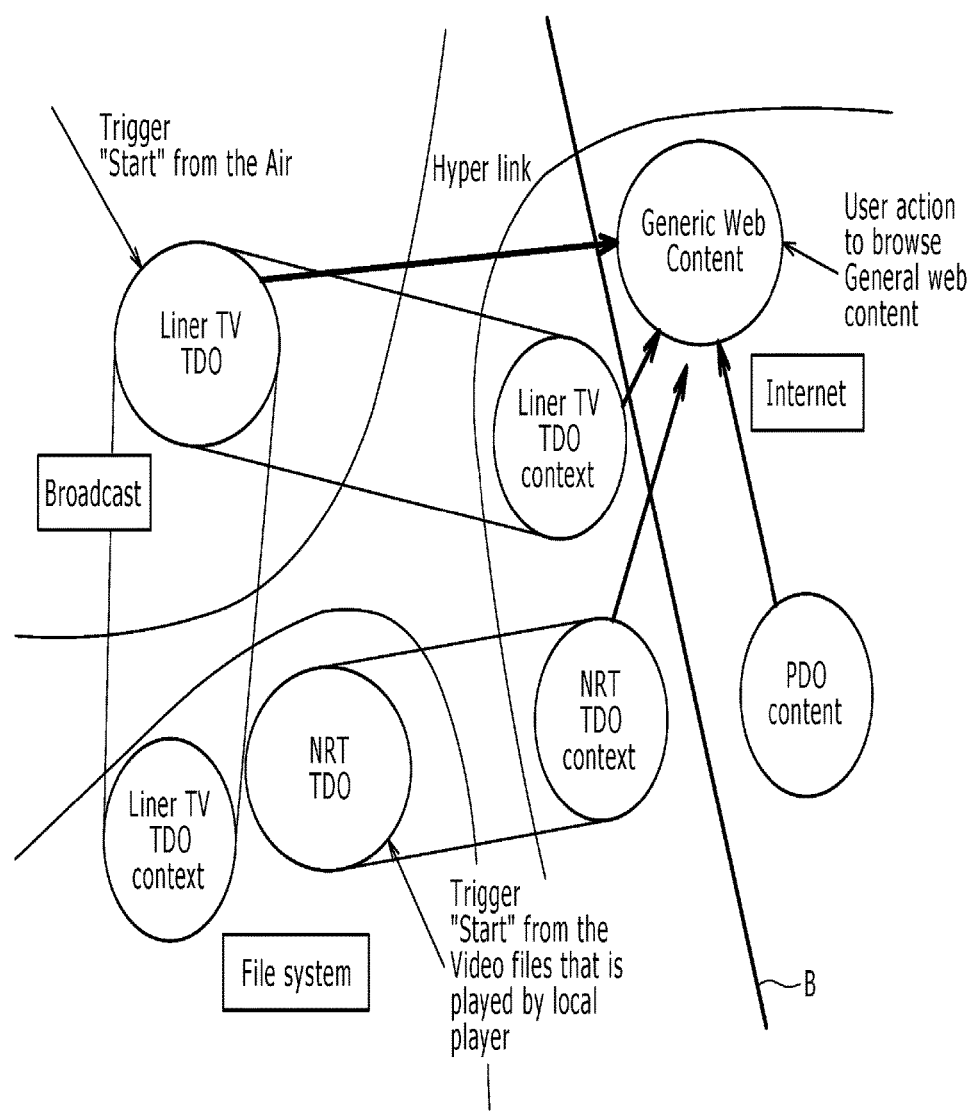
FIG. 4 is a view for explaining an outline of the present technology.

Next, FIG. 4 shows an outline of the present technology.

Referring to FIG. 4, when the HTML document of the left side of the boundary line B represented by heavy-line is executed, a specific process is allowed, and the HTML document of the right side of the boundary line B represented by heavy-line is executed, a specific process is limited. In addition, in FIG. 4, according to the mode of the HTML document, region is divided into three regions of Broadcast, Internet, and File system. Details are described below.

Specifically, for example, the receiving device 30 displays the video 43 as shown in FIG. 3 on the monitor not shown in the figure by obtaining a data broadcasting HTML document (corresponding to a Liner TV TDO content on the Internet in FIG. 4, for example) from the server 12 and executing the data broadcasting HTML document in response to reception of trigger information (corresponding to Trigger "Start" from the air in FIG. 4, for example) from the broadcasting device 11, or executing a data broadcasting HTML document (corresponding to a Liner TV TDO content in a File system in FIG. 4, for example) obtained from the server 12 in advance and already stored.

In addition, for example, when a program is viewed on the receiving device 30 using download broadcasting, which receives and stores the program (digital television broadcast signal) from the broadcasting device 11 in advance and reproduces the stored program in response to an operation of a user, the receiving device 30 displays the video 43 as shown in FIG. 3 by obtaining a data broadcasting HTML document (corresponding to an NRT TDO content in FIG. 4, for example) from the server 12 and executing the data broadcasting HTML document in response to obtainment of trigger information (corresponding to Trigger "Start" from the Video files that is played by local player in FIG. 4, for example) included in the stored program, or executing a data broadcasting HTML document (corresponding to NRT TDO in FIG. 4, for example) obtained from the broadcasting device 11 in advance and already stored by download broadcasting.

Further, for example, the receiving device 30 obtains a data broadcasting HTML document (corresponding, for example, to "PDO content" of FIG. 4), which can be displayed only by a specific browser, from the server 21.

Then, after the data broadcasting HTML document described above is executed, the receiving device 30 displays video 43 of FIG. 3 on the monitor 31.

It is to be noted that the download broadcasting signifies a broadcast of the type wherein a program (digital television broadcasting signal) from the broadcasting device 11 is received and recorded in advance, and in response to an operation of the user, the recorded program is reproduced. In the following description, the download broadcasting is referred to as NRT (Non Real Time) broadcasting, and a downloaded content is referred to as NRT content.

Incidentally, in this case, suppose for example that a driver (face) displayed as video 42 shown in FIG. 3 is provided with a link to a home page of the driver, and is selectable by a user.

When a user operation of selecting the driver on the video 42 in FIG. 3 is performed, the receiving device 30 displays the home page of the driver and the like on the monitor 31 by obtaining an HTML document for the home page (Generic Web Content in FIG. 4, for example) from a server 22 and executing the HTML document.

As described, when the receiving device 30 executes a data broadcasting HTML document, the receiving device 30 needs to be able to perform a specific process necessary to enhance service for data broadcasting.

Specifically, for example, when a weather forecast corresponding to a place of residence of the user is displayed on the receiving device 30 as service for data broadcasting, the data broadcasting HTML document needs to perform for example a process of reading area information indicating the place of residence of the user, which area information is already registered in the receiving device 30, as the specific process.

On the other hand, when a data broadcasting not permitted by the broadcaster, a home page or the like is displayed on the receiving device 30, for example, it is not desirable for the specific process to be performed by the HTML document of the data broadcasting or the HTML document for the home page.

Specifically, when a data broadcasting not permitted by the broadcaster is displayed, for example, an HTML document for the data broadcasting is obtained from a server 21 not managed on the broadcaster side, and executed. On the other hand, when a homepage is to be displayed, a homepage HTML document is obtained from the server 22, which is not managed by the broadcaster side, and is executed. In this case, unlike the server 12 managed on the broadcaster side, the server 21 or 22 not managed on the broadcaster side may have an HTML document for the data broadcasting or an HTML document for the home page which HTML document is created by a malicious third party. Here, an HTML document performing a process of illegally reading the area information registered in the receiving device 30 and supplying the area information to the server is assumed.

Accordingly, a management mode is set in the receiving device 30 such that the specific process can be performed on the left side of a boundary line B (represented by a thick line) shown in FIG. 4 and such that the specific process cannot be performed on the right side of the boundary line B. The receiving device 30 allows (or limits) the specific process to be performed by an HTML document according to the set management mode.

Incidentally, the specific process refers to a process that causes a disadvantage to the user when illegally performed by a malicious third party. For example, the specific process includes a process of illegally obtaining the personal information or the like of the user, thus threatening the security of the user.

The specific process is for example defined in advance by a user, a company that manufactures the receiving device 30, or the like. Incidentally, the specific process includes not only the above-described reading process but also for example a channel selecting process for selecting a channel, a recorder operating process for making the receiving device 30 perform recording or the like when the receiving device 30 functions as a video recorder, an obtaining process for obtaining program information related to a program on a channel being selected, and a bookmark control process for bookmarking a predetermined URL (Uniform Resource Locator).

Figure 5:
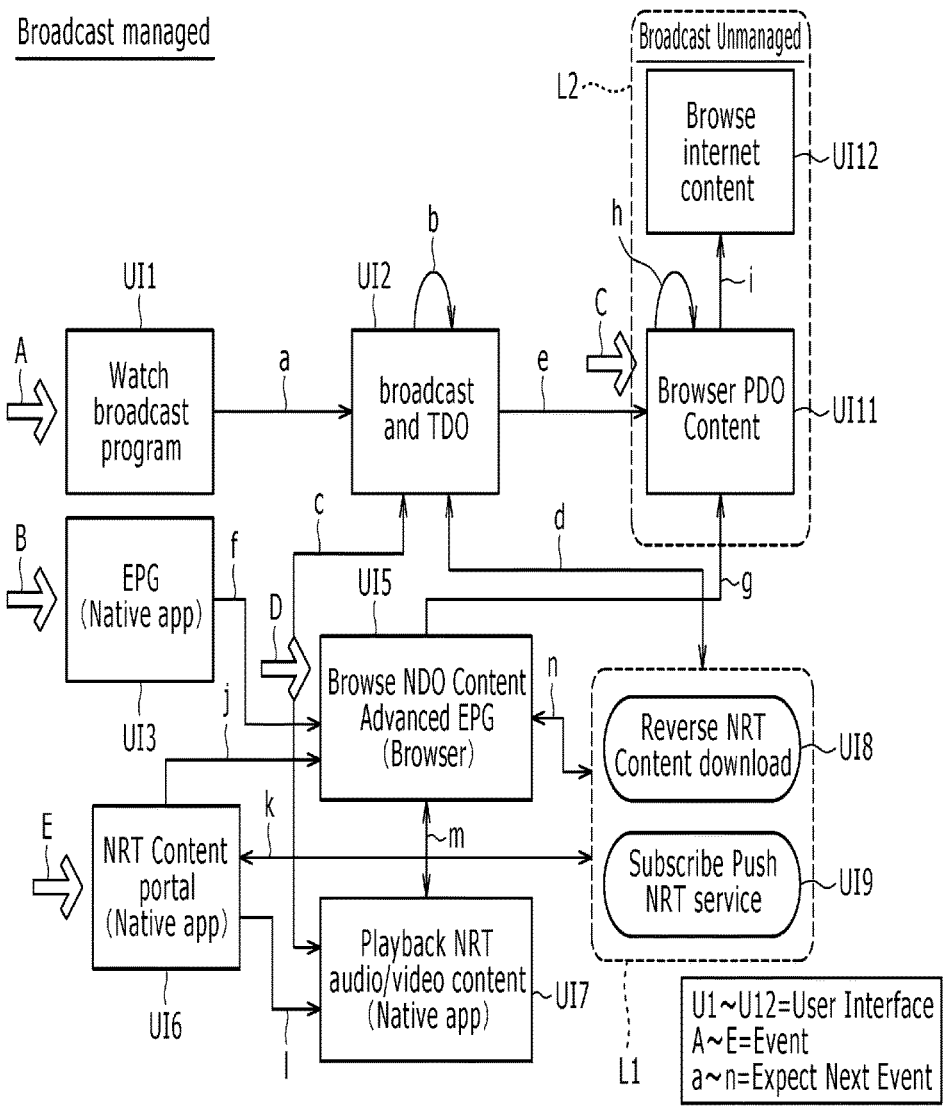
FIG. 5 is a view showing an example of transition of a screen displayed on the monitor.

FIG. 5 shows transitions of a screen displayed on the monitor 31 of the receiving device 30 when the HTML documents shown in FIG. 4 are executed. In the following, an example of a supposed use case is described with reference to FIG. 5.

In FIG. 5, reference characters UI1 to UI12 (except UI8, UI9) indicate each a user interface (User Interface, hereinafter referred to as UI) displayed on the monitor 31 of the receiving device 30. Meanwhile, a broken line L1 in the figure indicates a boundary between a foreground process and a background process, and processes executed by the UI8 and UI9 on the inner side of the region are not displayed on the monitor 31 and executed in the inside.

Further, reference characters A to E in the figure indicate each an event for the transition from a certain UI to a next UI. Further, a broken line L2 in the figure corresponds to the boundary B shown in FIG. 4, and a management mode is set such that, on the outer side of the boundary, a specific process can be performed while, on the inner side of the boundary, the specific process cannot be performed. In particular, as the management mode, on the outer side of the boundary of the broken line L2, "Broadcast Managed" wherein the specific process can be performed using a data broadcasting HTML document is set, but on the inner side of the boundary, "Broadcast Unmanaged" wherein the specific process cannot be performed using a data broadcasting HTML document or a homepage HTML document is set.

It is to be noted that "TDO," "NDO" and "PDO" are restricted in authority in the order of PDO, NDO and TDO as shown in FIG. 6. In particular, each DO (Downloadable Object) has the following characteristic.

The TDO (Triggered Downloadable Object) is a DO having the strongest authority among the three Dos, and is an object which can be handled by only the broadcaster. Meanwhile, the TDO content is supposed to be executed in an interlocked relationship with an AV content such as a program. It is to be noted that, since the TDO is a DO which is handled by the broadcaster, as the management mode therefor, "Broadcast Managed" is set without fail.

The NDO (NRT Downloadable Object) is a DO having the second strongest authority next to the TDO and is an object which can be handled by other operators than the broadcaster such as a content production company or a provider by which an NRT service is provided. Further, the NDO content is supposed not to be executed in an interlocked relationship with an AV content such as a program but also to be executed singly without being interlocked with an AV content. For example, when an NDO content is provided by an independent data broadcasting channel, it is executed without being interlocked with an AV content.

It is to be noted that NDOs are supposed to be classified into two types including those which are licensed from the broadcaster and those which are not licensed from the broadcaster, and as the management mode for them, "Broadcast Managed" is set to those NDOs which are licensed from the broadcaster and "Broadcast Unmanaged" is set to those NDOs which are not licensed from the broadcaster. In the example of FIG. 5, only those NDOs which are licensed from the broadcaster are described. In this instance, to each NDO, "Broadcast Managed" is set as the management mode without fail.

The PDO (Plain Downloadable Object) is a DO which has the weakest authority among the three DOs and is an object which can be displayed (executed) only by a specific application program (browser 73-2 of FIG. 9 hereinafter described). For example, the PDO can be displayed only by a browser prescribed by "Browser Profile A" of NRT1.0. Further, the PDO is an object which can be handled by an operator other than the broadcaster such as a content production company (for example, a so-called third party).

It is to be noted that, although PDOs are supposed to be divided into two types including those which are licensed from the broadcaster and those which are not licensed from the broadcaster, in the example of FIG. 5, only those PDOs which are not licensed from the broadcaster are described. In this instance, to each PDO, "Broadcast Unmanaged" is set as the management mode without fail.

Further, in FIG. 7, description regarding the events A to E of FIG. 5 is stated, and in FIG. 8, a relationship between the UI1 to UI12 of FIG. 5 and events a to n. In the following description of FIG. 5, also those figures are referred to.

As shown in FIG. 5, if a program of a predetermined channel is selected by the user as the event A, then the UI1 of the program of the selected channel or the like is displayed on the monitor 31 (description of the event A of FIG. 7). Further, on the receiving device 30, if trigger information is received from the broadcasting device 11 during display of the UI1, then a data broadcasting HTML document (TDO) is obtained from the server 12 and disposed in a superimposed relationship with the video of the program (description of the event a of the UI1 of FIG. 8).

Consequently, on the monitor 31, for example, the UI2 of the video 43 of FIG. 3 or the like is displayed.

Since the UI2 is positioned on the outer side of the boundary of the broken line L2, "Broadcast Managed" is set as the management mode, and the specific process can be performed using the broadcasting HTML document (TDO). In other words, since the broadcasting HTML document (TDO) is obtained from the server 12 managed by the broadcaster, the specific process is allowed.

Further, in the receiving device 30, if trigger information is received during display of the UI2, a new data broadcasting HTML document (TDO) is obtained and displayed (description of the event b of the UI2 of FIG. 8). Consequently, updating of the video (for example, the video 42 of FIG. 3) of the data broadcasting HTML document (TDO) superimposed on the video of the program. Further, if a data broadcasting HTML document (PDO) is received during display of the UI2, then the UI11 is displayed on the monitor 31 by a specific browser (description of the event c of the UI2 of FIG. 8). Further, if a PDO content is selected by the user as the event C, then the UI11 is displayed on the monitor 31.

Further, if a different PDO content is selected by the user during display of the UI11, then a data broadcasting HTML document (PDO) is received from the server 21 and the display of the UI11 is updated (description of the event h of the UI11 of FIG. 8). Further, if a web page is selected by the user during display of the UI11, then a homepage HTML is received from the server 22, and the UI12 is displayed on the monitor 31 (description of the event i of the UI11 of FIG. 8).

Since the UI11 and the UI12 are positioned on the inner side of the boundary of the broken line L2, "Broadcast Unmanaged" is set as the management mode, and it is not possible to perform the specific process using a data broadcasting HTML document (PDO) or a homepage HTML document. In other words, since a data broadcasting HTML document (PDO) or a homepage HTML document is obtained from the server 21 or the server 22 which are not licensed by the broadcaster, the specific process is restricted.

Further, if starting of reproduction of an NRT content is selected by the user during display of the UI2, then the UI7 of the NRT content being reproduced is displayed on the monitor 31 (description of the event c of the UI2 of FIG. 8). On the other hand, if stopping of the NRT content being reproduced is selected by the user during display of the UI7, then the NRT content being reproduced is stopped, and the display of the monitor 31 returns to the UI2 prior to the reproduction (description of the event c of the UI7 of FIG. 8).

It is to be noted that, although details are hereinafter described, when download reservation of an NRT content is selected by the user during display of the UI2, a process for download reservation of an NRT content is performed (description of the event d of the UI8 of FIG. 8). At this time, when a procedure for the entry into the NRT service for viewing an NRT content is to be performed, an entry procedure process is performed (description of the event d of the UI9 of FIG. 8). Those processes are performed as background processing.

If an EPG button provided on the remote controller 32 is depressed by the user as the event B, then the UI3 of an electronic program guide (EPG (Electronic Program Guide) is displayed on the monitor 31. If an item with regard to which detained program information is to be displayed is selected from within the electronic program guide by the user, then the UI5 of detailed program information is displayed on the monitor 31 (description of the event f of the UI3 of FIG. 8).

On the other hand, if, for example, an independent data broadcasting channel is selected by the user as the event D, then a broadcasting HTML document (NDO) is received from the server 12 and the UI5 of an NDO content is displayed on the monitor 31.

Since the UI5 is positioned on the outer side of the boundary of the broken line L2, "Broadcast Managed" is set as the management mode, and it becomes possible to perform the specific process using the broadcasting HTML document (NDO). In particular, since the broadcasting HTML document (NDO) is obtained from the server 12 managed by the broadcaster, the specific process is allowed.

Further, for example, if a desired NRT content is selected from within the list of NRT contents by the user during display of the UI5, then the NRT content is reserved for downloading (description of the event n of the UI5 of FIG. 8). Further, together with the process for download reservation (description of the event n of the UI8 of FIG. 8), an entry procedure process of the NRT service (description of the event n of the UI9 of FIG. 8) is performed as occasion demands. Those processes are performed as background processing. It is to be noted that downloading of the selected NRT content may be started immediately without performing the download reservation.

When the download of the NRT content ends, or when the download of the NRT content has been performed already, if starting of reproduction of the NRT content is selected by the user, then the UI7 of the NRT content being reproduced is displayed on the monitor 31 (description of the event m of the UI5 of FIG. 8). On the other hand, if stopping of the NRT content being reproduced is selected on the UI7, then the NRT content being reproduced is stopped, and the display of the monitor 31 returns to the UI5 prior to the reproduction (description of the event m of the UI7 of FIG. 8).

It is to be noted that, if a PDO content is selected by the user during display of the UI5 then a data broadcasting HTML document (PDO) is received from the server 21, and the UM is displayed on the monitor 31 (description of the event g of the UI5 of FIG. 8).

Further, if an NRT button provided on the remote controller 32 is depressed by the user as the event E, then the UI6 of a portal of an NRT content is displayed on the monitor 31. If an NDO content is selected from within the portal by the user during display of the UI6, then the UI5 is displayed (description of the event j of the UI6 of FIG. 8).

It is to be noted that, if download reservation of an NRT content is selected by the user during display of the UI6, then a download reservation process of an NRT content is performed (description of the event k of the UI6, UI8 of FIG. 8). At this time, an entry procedure process of the NRT service is performed as occasion demands (description of the event k of the UI6, UI8 of FIG. 8). Or, if starting of reproduction of the NRT content is selected by the user during display of the UI6, then the UI7 of the NRT content being reproduced is displayed on the monitor 31 (description of the event 1 of the UI6 of FIG. 8). On the other hand, if stopping of the NRT content is selected by the user, then the NRT content being reproduced is stopped and the display of the monitor 31 returns to the UI6 prior to the reproduction (description of the event 1 of the UI7 of FIG. 8).

As described above, although the UI transits in response to each use case, in the example of FIG. 5, "Broadcast Managed" is set as the management mode to a data broadcasting HTML document (TDO) and a data broadcasting HTML document (NDO) while "Broadcast Unmanaged" is set to a data broadcasting HTML document (PDO) and a homepage HTML.

It is to be noted that, while, as described hereinabove, the range of the broken line L2 which forms a boundary for setting of a management mode shown in FIG. 5 is an example and, in FIG. 5, a data broadcasting HTML document (NDO) which is licensed from the broadcaster is illustrated, in the case of a data broadcasting HTML document (NDO) which is not licensed from the broadcaster, "Broadcast Unmanaged" is set as the management mode. In this instance, for example, the UI5 is disposed on the inner side of the boundary of the broken line L2. Further, while, in the example of FIG. 5, a data broadcasting HTML document (PDO) which is not licensed from the broadcaster is illustrated, in the case of a data broadcasting HTML document (PDO) which is licensed by the broadcaster, "Broadcast Managed" is set as the management mode. In this instance, for example, the UI11 is disposed on the outer side of the broken line L2.

The essential thing is that, although "Broadcast Managed" is set without fail to a data broadcasting HTML document (TDO), with regard to other data broadcasting HTML document (NDO) and data broadcasting HTML document (PDO), since the management mode varies in response to the license of the broadcaster, it is optional which one of "Broadcast Managed" and "Broadcast Unmanaged" is set. Further, to a homepage HTML, "Broadcast Unmanaged" is set without fail as the management mode.

It is to be noted that "Native app" described in FIG. 5 signifies an application program for exclusive use for the receiving device (application program executed by a control section 68 of FIG. 9 hereinafter described), and "Browser" signifies a browser for browsing a web page and so forth (73-1 of FIG. 9 hereinafter described).

[Example of Configuration of Receiving Device 30]

Figure 9:
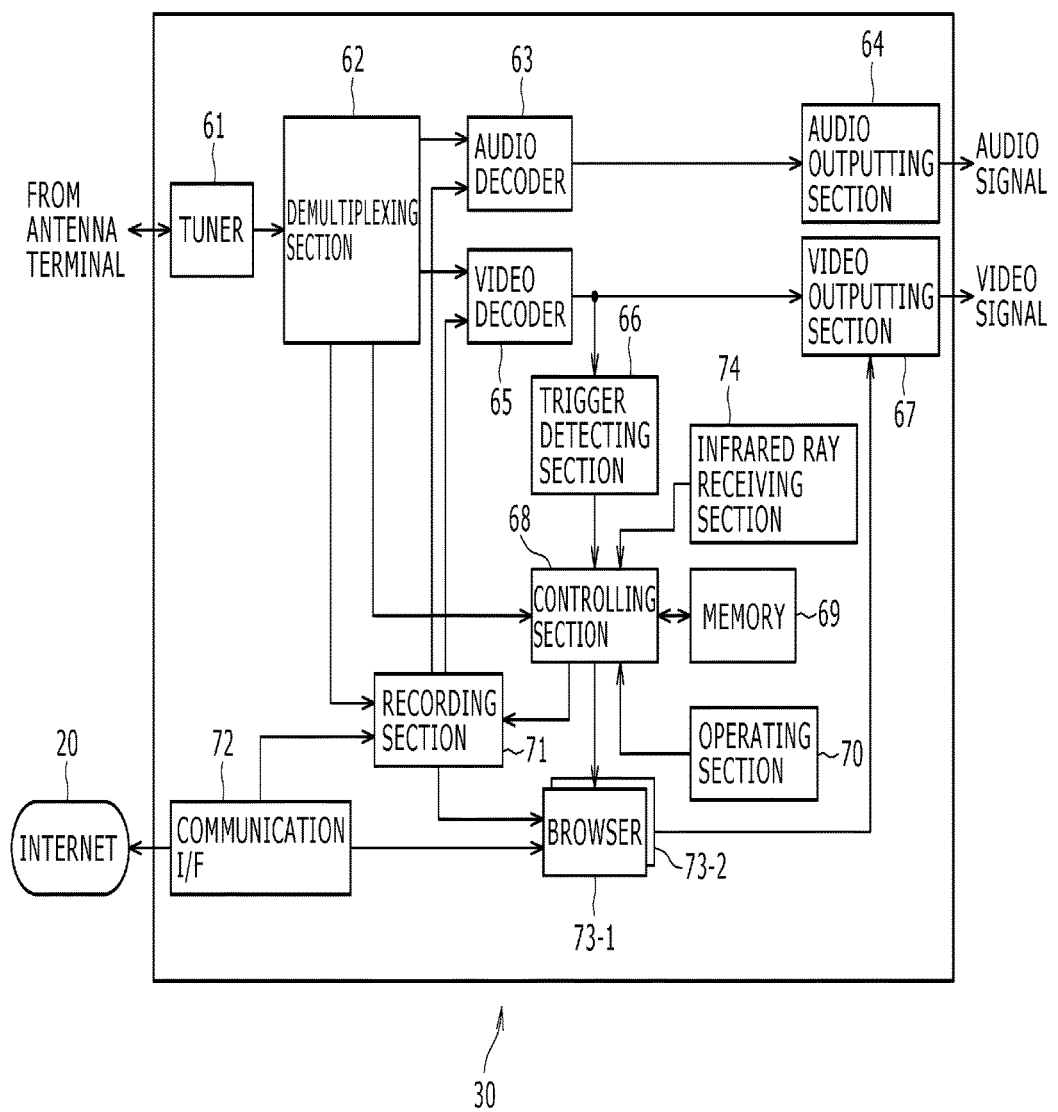
FIG. 9 is a block diagram showing an example of configuration of the receiving device.

FIG. 9 shows an example of configuration of the receiving device 30. The receiving device 30 includes a tuner 61, a demultiplexing section 62, an audio decoder 63, an audio outputting section 64, a video decoder 65, a trigger detecting section 66, a video outputting section 67, a controlling section 68, a memory 69, an operating section 70, a recording section 71, a communication I/F 72, and browsers 73-1 and 73-2, and an infrared ray receiving section 74.

The tuner 61 receives and demodulates a digital television broadcast signal corresponding to a channel selected by the user, and outputs a resulting TS to the demultiplexing section 62. The demultiplexing section 62 divides the TS input from the tuner 61 into an audio coded signal, a video coded signal, and a control signal, and outputs the audio coded signal, the video coded signal, and the control signal to the audio decoder 63, the video decoder 65, and the controlling section 68, respectively.

Further, the demultiplexing section 62 extracts a PCR packet including trigger information disposed in the TS, and then outputs the PCR packet to the controlling section 68.

The audio decoder 63 decodes the input audio coded signal, and outputs a resulting audio signal to the audio outputting section 64. The audio outputting section 64 outputs the input audio signal to a subsequent stage (speaker, for example).

The video decoder 65 decodes the input video coded signal, and outputs a resulting video signal to the trigger detecting section 66 and the video outputting section 67.

The trigger detecting section 66 always monitors the input video signal, detects trigger information embedded in the video signal, and supplies the trigger information to the controlling section 68. Incidentally, the trigger information can also be transmitted so as to be embedded in the video signal of the AV contents corresponding to the digital television broadcast signal.

Thus, when the trigger information is embedded in the video signal and transmitted from the broadcasting device 11 to the receiving device 30, the trigger detecting section 66 detects the trigger information embedded in the input video signal.

Suppose in the following that the trigger information is transmitted in a state of being stored in a PCR packet. Description of the case where the trigger information is transmitted in a state of being embedded in the video signal will be omitted as appropriate.

The video outputting section 67 outputs the video signal input from the video decoder 65 to the monitor 31 (FIG. 3). In addition, the video outputting section 67 combines the video signal (corresponding to the video 42 in FIG. 3, for example) for data broadcasting which video signal is input from the browser 73-1 and the browser 73-2 with the video signal (corresponding to the video 41 in FIG. 3, for example) input from the video decoder 65, and outputs the result to the monitor 31.

Further, the video outputting section 67 outputs a video signal for showing a home page or the like, which video signal is input from the browser 73-1, to the monitor 31.

The controlling section 68 controls each block forming the receiving device 30 by executing a controlling program recorded in the memory 69 in advance. The controlling section 68 also controls the obtainment, execution (starting), event firing, ending or the like of a data broadcasting HTML document (TDO) for realizing service for data broadcasting interlocked with a television program on the basis of the trigger information input from the demultiplexing section 62 (or the trigger detecting section 66).

The controlling program executed by the controlling section 68 is recorded in the memory 69 in advance. The controlling program can be updated on the basis of the digital television broadcast signal or update data obtained via the Internet 20.

In addition, management mode information indicating a management mode is recorded in the memory 69. The management mode is changed by rewriting the management mode information. Details of the management mode will be described later with reference to FIG. 13 and FIG. 14. The operating section 70 receives various operations from the user, and notifies operating signals corresponding to the operations to the controlling section 68.

The operating section 70 accepts various operations from the user and notifies the controlling section 68 of a corresponding operation signal. The infrared ray receiving section 74 receives an operation signal transmitted using wireless communication by infrared rays from the remote controller 32 (FIG. 3) and notifies the controlling section 68 of the operation signal. The controlling section 68 controls operation of the components of the receiving device 30 based on the operation signal supplied thereto from the operating section 70 or the remote controller 32.

When a data broadcasting HTML document is distributed using the digital television broadcast signal, the recording section 71 retains the data broadcasting HTML document input from the demultiplexing section 62 on a built-in recording medium.

The communication I/F 72 connects itself to the server 12 or the server 21 via the Internet 20 under control of the browser 73-1 or the browser 73-2. Then, under control of the browser 73 or the browser 73-2, the communication I/F 72 obtains a data broadcasting HTML document from the server 12 or the server 21 via the Internet 20, and supplies the data broadcasting HTML document to the browser 73 or the browser 73-2.

The communication I/F 72 also connects itself to a server 22 via the Internet 20 under control of the browser 73-1. Then, under control of the browser 73-1, the communication I/F 72 obtains an HTML document for a home page from the server 22 via the Internet 20, and supplies the HTML document to the browser 73-1.

The browser 73-1 under control of the controlling section 68 executes the data broadcasting HTML document (TDO) or the data broadcasting HTML document (NDO) from the communication I/F 72, thereby generates a video signal for data broadcasting, and supplies the video signal for data broadcasting to the video outputting section 67.

In addition, the browser 73-1 under control of the controlling section 68 executes the HTML document for the home page from the communication I/F 72, thereby generates a video signal for showing the home page and the like, and supplies the video signal to the video outputting section 67.

The browser 73-2 is a specific browser prescribed, for example, in "Browser Profile A" of NRT1.0. The browser 73-2 executes a data broadcasting HTML document (PDO) from the communication I/F 72 to generate a video signal for data broadcasting under the control of the controlling section 68 and supplies the video signal to the video outputting section 67.

Meanwhile, the demultiplexing section 62 separates, when a digital television broadcasting signal of NRT broadcasting is received by the tuner 61, a TS after demodulation and records the TS into the recording section 71. If an instruction to reproduce an NRT content is issued by the user, then the recording section 71 supplies an audio decoded signal and a video decoded signal to the audio decoder 63 and the video decoder 65, respectively, under the control of the controlling section 68. Consequently, reproduction of the NRT content is performed.

It is to be noted that, if an NRT content is obtained from a server (not shown) for delivery connected to the Internet 20, the recording section 71 records an NRT content from the delivery server received by the communication I/F 72.

The receiving device 30 is configured in such a manner as described above.

[Details of Trigger Information]

Figure 10:
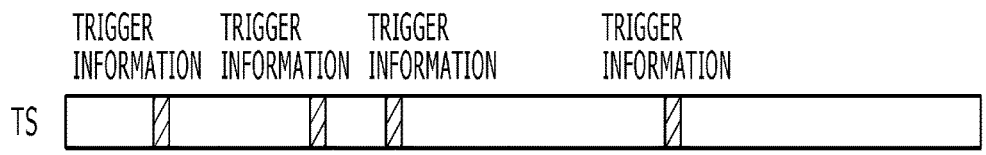
FIG. 10 is a view showing a concept in a case where trigger information is stored and transmitted in PCR packets of a TS.

FIG. 10 shows a concept in a case where trigger information is stored and transmitted in PCR packets of a TS. As shown in FIG. 10, not all PCR packets store trigger information, but trigger information is stored in PCR packets only in appropriate timing for interlocking with AV contents corresponding to a television program.

Incidentally, depending on contents of trigger information, trigger information of the same contents may be transmitted a plurality of times in consideration of a case where the trigger information is not received by the receiving device 30.

Figure 11:
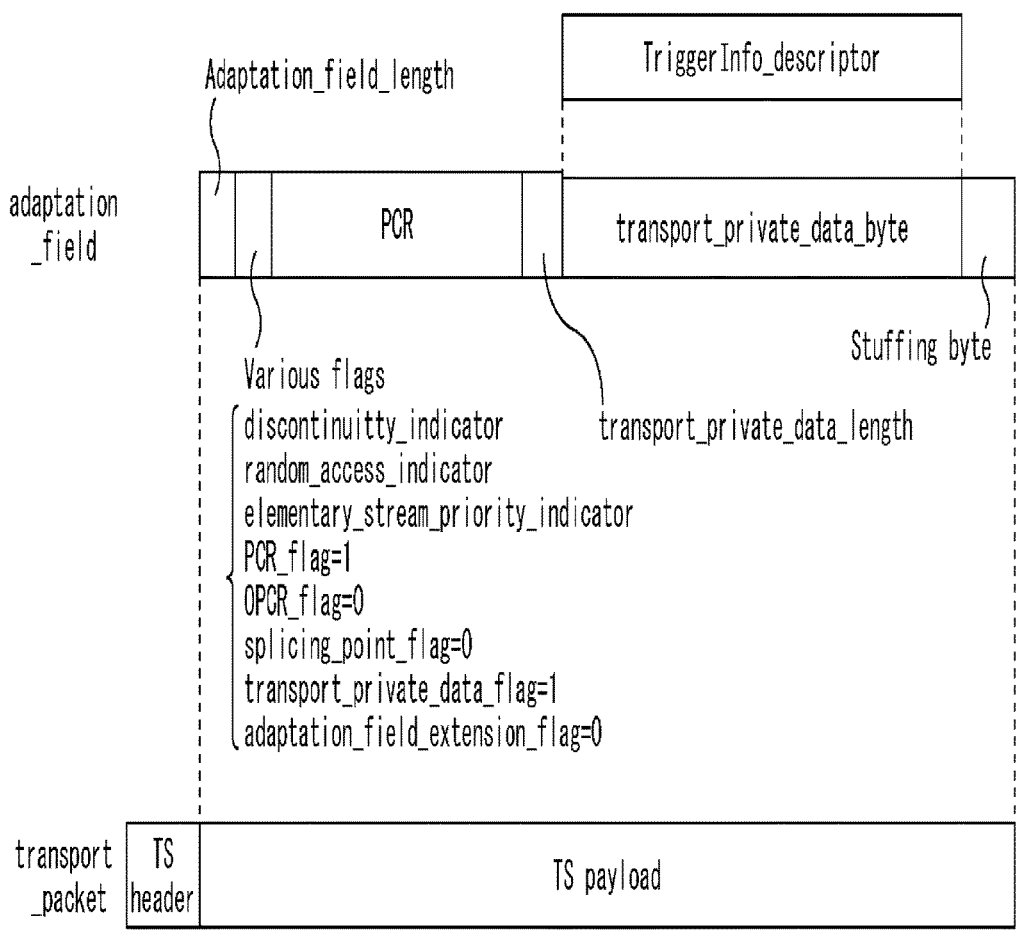
FIG. 11 is a view showing a position of a PCR packet at which trigger information is stored.

FIG. 11 shows a position where trigger information is stored in a PCR packet. The PCR packet has PCR stored in the adaptation_field of a TS packet. The trigger information (TriggerInfo_descriptor) is stored in transport_private_data_byte following the PCR. Incidentally, when trigger information is stored, the transport_private_data_flag of Various_flags provided in front of the PCR is set at one.

FIG. 12 shows an example of information items included in trigger information.

A trigger ID is information for identifying the trigger information in question. When trigger information of the same contents is transmitted a plurality of times, the trigger ID of each piece of trigger information is identical. A trigger type indicates that the trigger information in question is one of an application start (giving an instruction to obtain and execute (start) a data broadcasting HTML document (TDO)), an application end (giving an instruction to end the data broadcasting HTML document (TDO) being executed), an application event (giving an instruction to fire an event (update of display contents or the like) in the data broadcasting HTML document (TDO) being executed), and a pre-cache (giving an instruction only to obtain the data broadcasting HTML document (TDO)).

An application ID is information for identifying the data broadcasting HTML document (TDO) corresponding to the trigger information in question. An application type is information indicating the type (html) of the data broadcasting HTML document (TDO) corresponding to the trigger information in question. A provider ID is information for identifying a provider (broadcasting station or the like) performing service for execution of the data broadcasting HTML document (TDO) corresponding to the trigger information in question. An application URL (Uniform Resource Locator) is the URL of a destination from which to obtain the data broadcasting HTML document (TDO) in the case where the trigger type is the application start or the pre-cache. A stored application ID is described only when specifying the stored (already obtained) data broadcasting HTML document (TDO) to be started without instantly obtaining the data broadcasting HTML document (TDO) in the case where the trigger type is the application start.

An automatic start flag is described in the case where the trigger type is the application start. The automatic start flag is set on or off. When the automatic start flag is on, an automatic start is made (the data broadcasting HTML document (TDO) is started automatically). When the automatic start flag is off, a manual start is made (the user is prompted to perform an operation input, and a start is made in response to the performance of the operation input).

An application end time is information indicating a time to end the data broadcasting HTML document (TDO) when the trigger information whose trigger type is the application end cannot be received.

An application name is the name of service (realized by the data broadcasting HTML document (TDO)) for data broadcasting to be presented to the user when the automatic start flag indicates the manual start, for example. An event ID is information for identifying an event when the trigger type is the application event. Incidentally, the trigger information does not always include all of the above-described items, but includes only necessary items in the timing of the trigger information.

FIG. 13 shows an example of syntax of the trigger information. Incidentally, the syntax of the trigger information is arbitrary, and is not limited to FIG. 13.

[TDO Content Starting Process]

Description will next be made of a trigger information corresponding process performed when the receiving device 30 receives trigger information.

FIG. 14 is a flowchart for explaining a TDO content started by the trigger information corresponding process. This trigger information corresponding process is executed when the user is viewing a television program, for example, when the event a, b of FIG. 5 occurs, and is repeatedly performed while a digital television broadcast signal is received.

In step S1, the controlling section 68 stands by until a PCR packet including trigger information is received on the basis of input from the demultiplexing section 62. When a PCR packet including trigger information is received, the controlling section 68 advances the process to step S2.

In step S2, the controlling section 68 extracts the trigger information from the received PCR packet, and determines whether a process from step S3 on down has already been performed for the trigger information on the basis of the trigger information. When it is determined that the process from step S3 on down has already been performed, the process is returned to step S1 to repeat the process from step S1 on down. When it is determined that the process from step S3 on down has not been performed for the trigger information, on the other hand, the process is advanced to step S3.

In step S3, the controlling section 68 determines whether the trigger type of the trigger information in question is the application start, the application event, the application end, or the pre-cache.

When it is determined in step S3 that the trigger type of the trigger information in question is the application start, the process is advanced to step S4.

In step S4, the controlling section 68 determines whether a stored application ID is specified in the trigger information in question and whether the data broadcasting HTML document (TDO) corresponding to the trigger information is already stored in the recording section 71.

When the determination is made in the negative in step S4, the process is advanced to step S5. In step S5, the controlling section 68 controls the browser 73 so as to make the browser 73-1 access the server 12 corresponding to the application URL of the trigger information and obtain the data broadcasting HTML document (TDO) corresponding to the application ID of the trigger information. When the corresponding data broadcasting HTML document (TDO) is already obtained from the server 12 corresponding to the above URL and pre-cached in step S14 to be described later, the process of step S5 is skipped, and the data broadcasting HTML document (TDO) is used in a process from step S7 on down. The process is thereafter advanced to step S7.

When it is determined in step S4 that the stored application ID is specified in the trigger information in question and that the data broadcasting HTML document (TDO) corresponding to the trigger information is already stored in the recording section 71, the process is advanced to step S6. In step S6, the controlling section 68 controls the browser 73 so as to make the browser 73-1 read the data broadcasting HTML document (TDO) corresponding to the stored application ID of the trigger information from the recording section 71. The process is thereafter advanced to step S7.

In step S7, the controlling section 68 determines whether the automatic start flag of the trigger information indicates the automatic start.

When it is determined in step S7 that the automatic start flag of the trigger information does not indicate the automatic start (that is, the automatic start flag of the trigger information indicates the manual start), the process is advanced to step S8. In step S8, the browser 73-1 prompts the user for an operation of starting (operation of executing) the data broadcasting HTML document (TDO) by displaying for example "Execute (application name)?" on a screen under control of the controlling section 68. When it is determined in step S9 that the starting operation is input from the user in response to the prompt display, the process is advanced to step S11. In step S11, the browser 73-1 starts (executes) the data broadcasting HTML document (TDO)

obtained in step S5 or read in step S6 under control of the controlling section 68. Thus, TDO content is started.

Thereafter, the process is returned back to step 1 and the processes are repeated from step 1.

Incidentally, when it is determined in step S9 that the starting operation is not input from the user after the prompt display in step S8, and it is determined in step S10 that a predetermined time has passed without the starting operation being input from the user, the process is returned to step S1, and the process from step S1 on down is repeated.

When it is determined in step S7 that the automatic start flag of the trigger information indicates the automatic start, the process is advanced to step S11. In step S11, the browser 73-1 starts the data broadcasting HTML document (TDO) obtained in step S5 or read in step S6 under control of the controlling section 68. When the TDO content is started, the process is returned to step S1, and the process from step S1 on down is repeated. When it is determined in step S3 that the trigger type of the trigger information in question is the application event, the process is advanced to step S12. In step S12, the controlling section 68 controls the browser 73-1 so as to fire (execute) an event corresponding to the event ID of the trigger information in the data broadcasting HTML document (TDO) being executed only when the application ID of the trigger information in question and the application ID of the data broadcasting HTML document (TDO) being executed coincide with each other. Thereafter, the process is returned to step S1, and the process from step S1 on down is repeated.

When it is determined in step S3 that the trigger type of the trigger information in question is the application end, the process is advanced to step S13. In step S13, the controlling section 68 controls the browser 73-1 so as to end the data broadcasting HTML document (TDO) being executed only when the application ID of the trigger information in question and the application ID of the data broadcasting HTML document (TDO) being executed coincide with each other. Thereafter, the process is returned to step S1, and the process from step S1 on down is repeated.

Incidentally, even in a case where the trigger information whose trigger type is the application end is not received, the data broadcasting HTML document (TDO) being executed is ended when a present time reaches the application end time described in the trigger information at the time of starting the data broadcasting HTML document (TDO) being executed.

When it is determined in step S3 that the trigger type of the trigger information in question is the pre-cache, the process is advanced to step S14. In step S14, the controlling section 68 controls the browser 73 to make the browser 73-1 access the server 12 corresponding to the application URL of the trigger information, obtain the data broadcasting HTML document (TDO) corresponding to the application ID of the trigger information, and store (pre-cache) the data broadcasting HTML document (TDO) in storing means such as a cache memory or the like included in the browser 73-1. Thereafter, the process is returned to step S1, and the process from step S1 on down is repeated.

When the trigger type is the pre-cache as in step S14, the corresponding data broadcasting HTML document (TDO) can be obtained before the broadcasting time of the television program desired to be interlocked. Thereby the corresponding data broadcasting HTML document (TDO) can be executed at the same time as a start of the television program desired to be interlocked.

This concludes the description of the TDO content starting process.

[Example of Screen Display when Data Broadcasting HTML document (TDO) is Executed]

Figure 15:
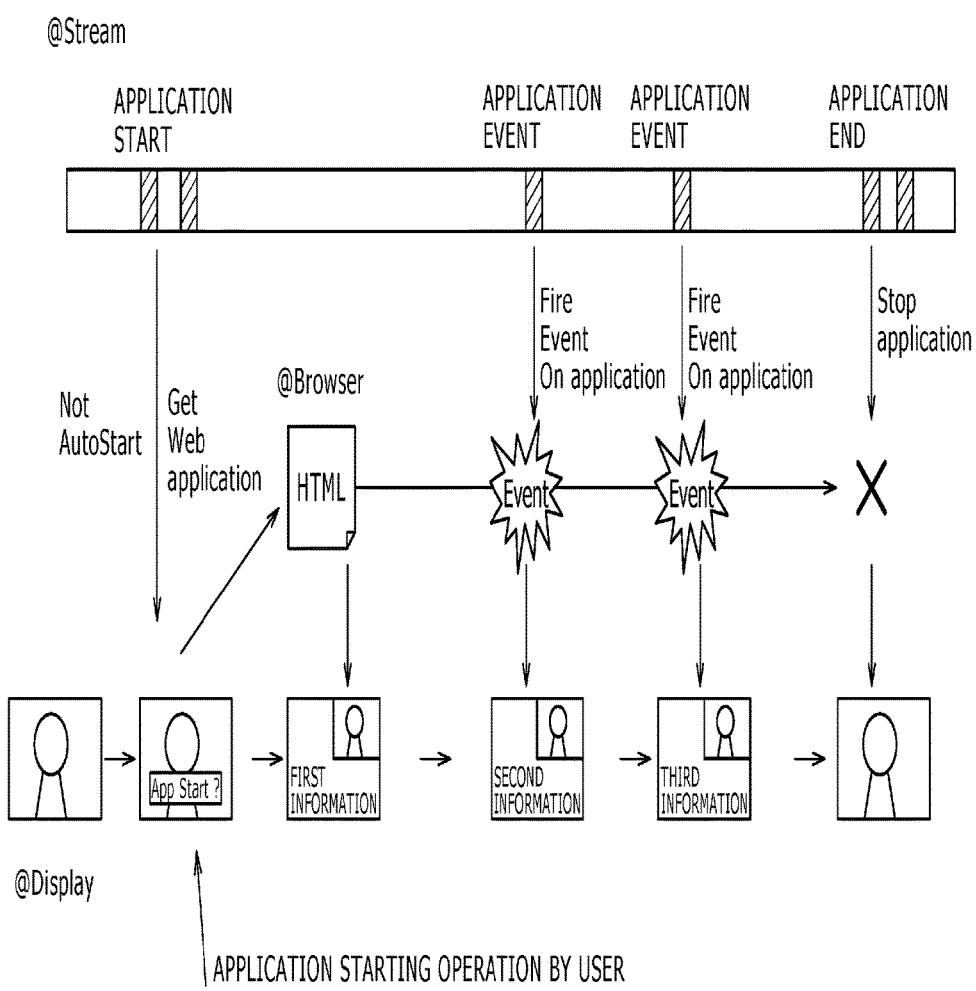
FIG. 15 is a view showing an example of transitions of a screen when a data broadcasting HTML document (TDO) is executed so as to be interlocked with the progress of a television program.

Next, FIG. 15 shows transitions of a screen when a data broadcasting HTML document (TDO) is executed so as to be interlocked with the progress of a television program in a case where the automatic start flag of trigger information is off (manual start).

When trigger information whose trigger type is the application start and whose automatic start flag is off (manual start) is received while the user is viewing a television program, a corresponding data broadcasting HTML document (TDO) (corresponding to HTML in FIG. 15) is obtained. Next, a display (corresponding to "App Start?" in FIG. 15) prompting the user for an operation of starting the data broadcasting HTML document (TDO) is displayed in a state of being superimposed on the video of the television program. When the user inputs the starting operation in response to the prompt, the data broadcasting HTML document (TDO) is executed, and screen display becomes for example the video 43 obtained by combining the video 41 of the television program with the video 42 of TDO content as shown in FIG. 3.

When trigger information whose trigger type is the application event is received in a state of the data broadcasting HTML document (TDO) being executed, an event corresponding to the event ID of the trigger information is fired in the data broadcasting HTML document (TDO) being executed. Thereby, an area (for example an area displaying the video 42 in FIG. 3) displaying the TDO content in the screen display is changed to video corresponding to the event ID of the trigger information (for example changed from "first information" to "second information" or from "second information" to "third information").

When trigger information whose trigger type is the application end is thereafter received, the data broadcasting HTML document (TDO) being executed is ended, and only the video 41 of the television program is displayed on the entire screen.

[Another Example of Screen Display when Data Broadcasting HTML document (TDO) is Executed]

Incidentally, a data broadcasting HTML document (TDO) executed so as to be interlocked with the progress of a television program does not necessarily involve screen display. When such a data broadcasting HTML document (TDO) is used, the data broadcasting HTML document (TDO) can be executed without being noticed by the user of the receiving device 30. Such a data broadcasting HTML document (TDO) can be applied to a case of surveying the audience rating of a television program, for example. Specifically, when whether a television program is viewed is recorded so as to correspond to trigger information whose trigger type is the application event, and a result of the recording is notified to a predetermined server or the like in predetermined timing, the audience rating of the television program can be surveyed at intervals of transmission of the trigger information whose trigger type is the application event.

Figure 16:
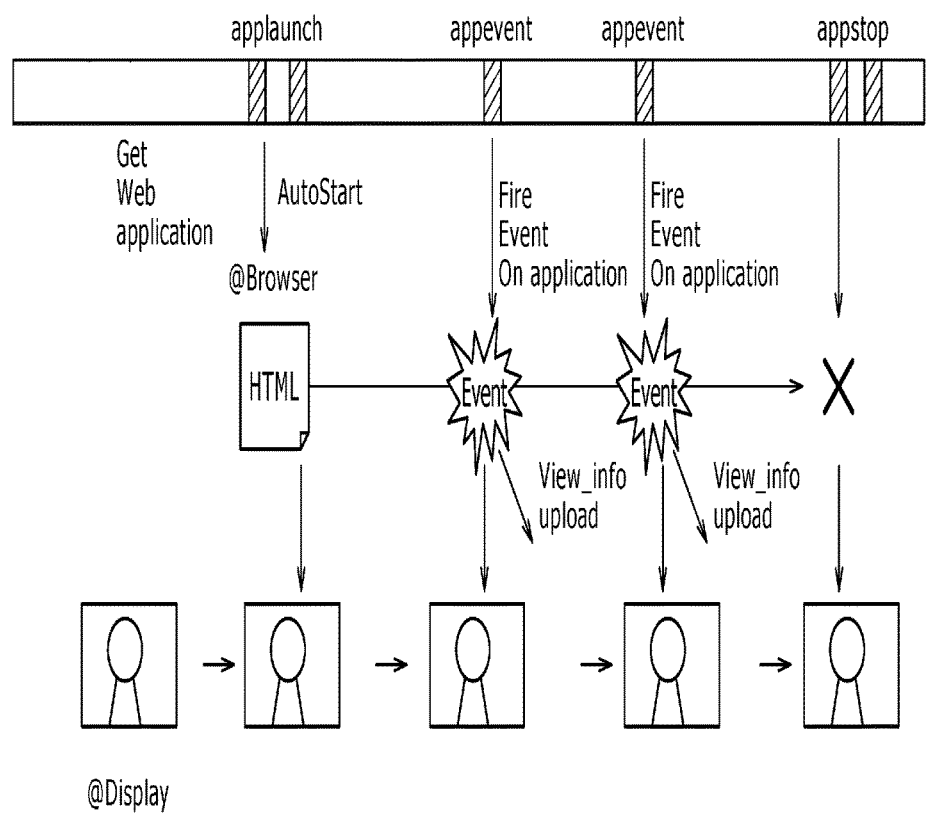
FIG. 16 is a view showing an example of transitions of a screen when a data broadcasting HTML document (TDO) not involving screen display is executed so as to be interlocked with the progress of a television program.

FIG. 16 shows transitions of a screen when a data broadcasting HTML document (TDO) not involving screen display is executed so as to be interlocked with the progress of a television program in a case where the automatic start flag of trigger information is on (automatic start).

When trigger information whose trigger type is the application start and whose automatic start flag is on (automatic start) is received while the user is viewing a television program, a corresponding data broadcasting HTML document (TDO) is obtained and executed. However, screen display is not changed with only the video 41 of the television program displayed.

When trigger information whose trigger type is the application event is received in a state of the data broadcasting HTML document (TDO) being executed, an event corresponding to the event ID of the trigger information is fired in the data broadcasting HTML document (TDO) being executed. Also in this case, screen display is not changed with the video 41 of the television program displayed.

When trigger information whose trigger type is the application end is thereafter received, the data broadcasting HTML document (TDO) being executed is ended.

[Life Cycle of TDO Content]

Figure 17:
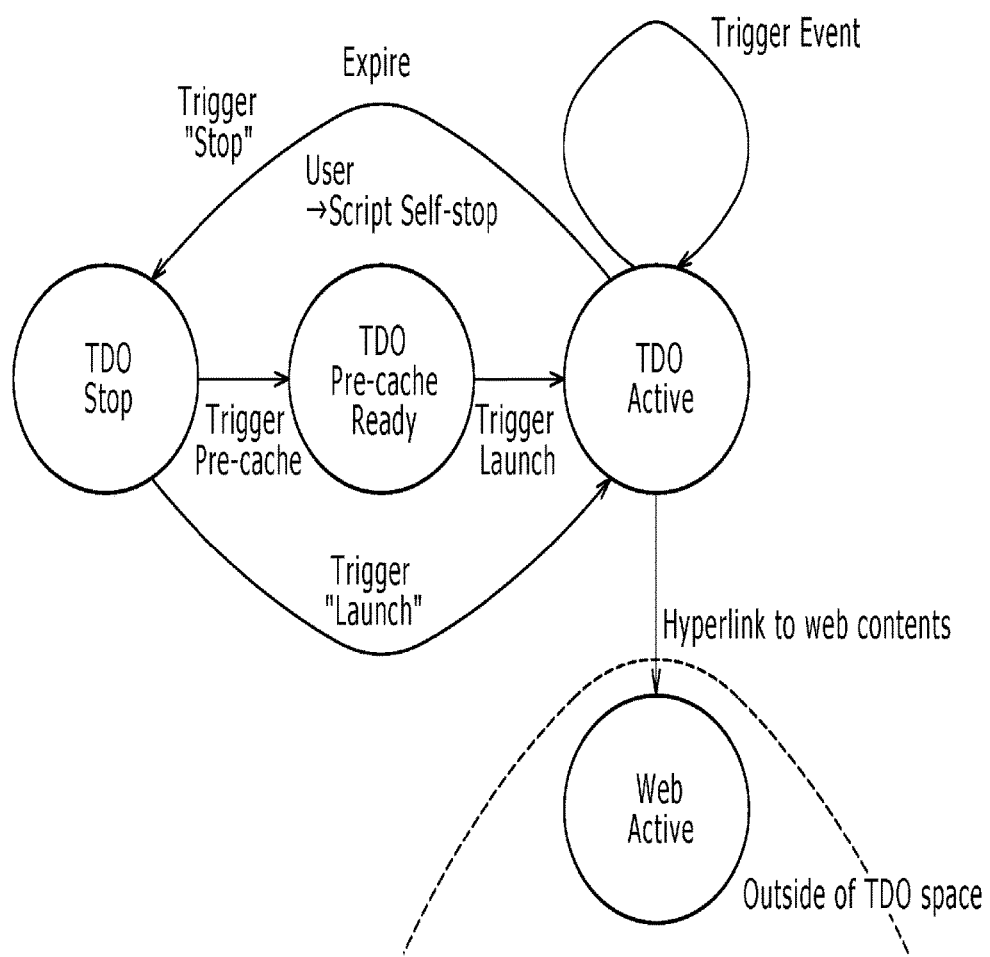
FIG. 17 is a view showing an example of a life cycle of a data broadcasting HTML document (TDO)

Next, FIG. 17 shows an example of a life cycle of a TDO Content.

When trigger information whose trigger type is the application start is received in a case where a data broadcasting HTML document (TDO) to be obtained and executed by the receiving device 30 is in a TDO stop operation state (corresponding to TDO Stop in FIG. 17), that is, in a case where the receiving device 30 has not obtained the data broadcasting HTML document (TDO), a transition is made from the TDO stop operation state to a TDO active operation state (corresponding to TDO Active in FIG. 17), and the data broadcasting HTML document (TDO) is obtained from the server 12.

Then, a display prompting the user for an operation of starting the data broadcasting HTML document (TDO) is displayed in a state of being superimposed on the video of a television program. When the user inputs the starting operation in response to the prompt, the data broadcasting HTML document (TDO) is started, and screen display becomes for example the video 43 obtained by combining the video 41 of the television program with the video 42 of TDO content as shown in FIG. 3.

In the TDO active operation state, the receiving device 30 can perform a specific process to display the video 42 of the data broadcasting contents by the obtained data broadcasting HTML document (TDO). That is, the management mode of the receiving device 30 in the TDO active operation state is "Broadcast managed," allowing the specific process using the data broadcasting HTML document (TDO) obtained from the server 12 managed on the broadcaster side.

When trigger information whose trigger type is the application event is received in the TDO active operation state, an event corresponding to the event ID of the trigger information is fired in the data broadcasting HTML document (TDO) being executed.

Incidentally, when trigger information whose trigger type is the application end is received or an application end time has arrived in the TDO active operation state, a transition is made from the TDO active operation state to the TDO stop state, and the obtained data broadcasting HTML document (TDO) is discarded, for example.

In addition, when trigger information whose trigger type is the pre-cache is received in the TDO stop operation state, a transition is made from the TDO stop operation state to a TDO pre-cache ready operation state, and the corresponding data broadcasting HTML document (TDO) is obtained and pre-cached.

When trigger information whose trigger type is the application start is received in the TDO pre-cache ready operation state, a transition is made from the TDO pre-cache ready operation state to the TDO active operation state. Then, the pre-cached data broadcasting HTML document (TDO) is started in the TDO active operation state.

In addition, when a button or the like provided with a link to a home page of an automobile or the like is pressed by a user operation in the TDO active operation state, a transition is made from the TDO active operation state to a Web active operation state (corresponding to "Web Active" in FIG. 17). Then, in the Web active operation state, an HTML document (TDO) for the home page from a server 22 not managed on the broadcaster side is executed for example to display the home page of the automobile or the like.

In the Web active operation state, the receiving device 30 cannot perform a specific process by the obtained HTML document (TDO) for the home page. That is, the management mode of the receiving device 30 in the Web active operation state is "Broadcast unmanaged," not allowing a specific process using the HTML document (TDO) for the home page obtained from a server 22 not managed on the broadcaster side.

In the TDO active operation state (the management mode is set at "Broadcast managed"), a specific process such for example as reading area information already recorded in the receiving device 30 needs to be allowed in order to provide service for data broadcasting.

In the Web active operation state (the management mode is set at "Broadcast unmanaged"), on the other hand, the specific process needs to be prevented from being performed in order to prevent the area information already recorded in the receiving device 30 from being illegally read and leaked.

Accordingly, in the receiving device 30, as described above, when an HTML document to be executed is obtained from the server 12 managed on the broadcaster side, the management mode is set at "Broadcast managed" to allow the specific process.

Conversely, in the receiving device 30, when an HTML document (TDO) to be executed is obtained from a server not managed on the broadcaster side, the management mode is set at "Broadcast unmanaged" so as not to allow the specific process.

[Management Mode]

Figure 18:
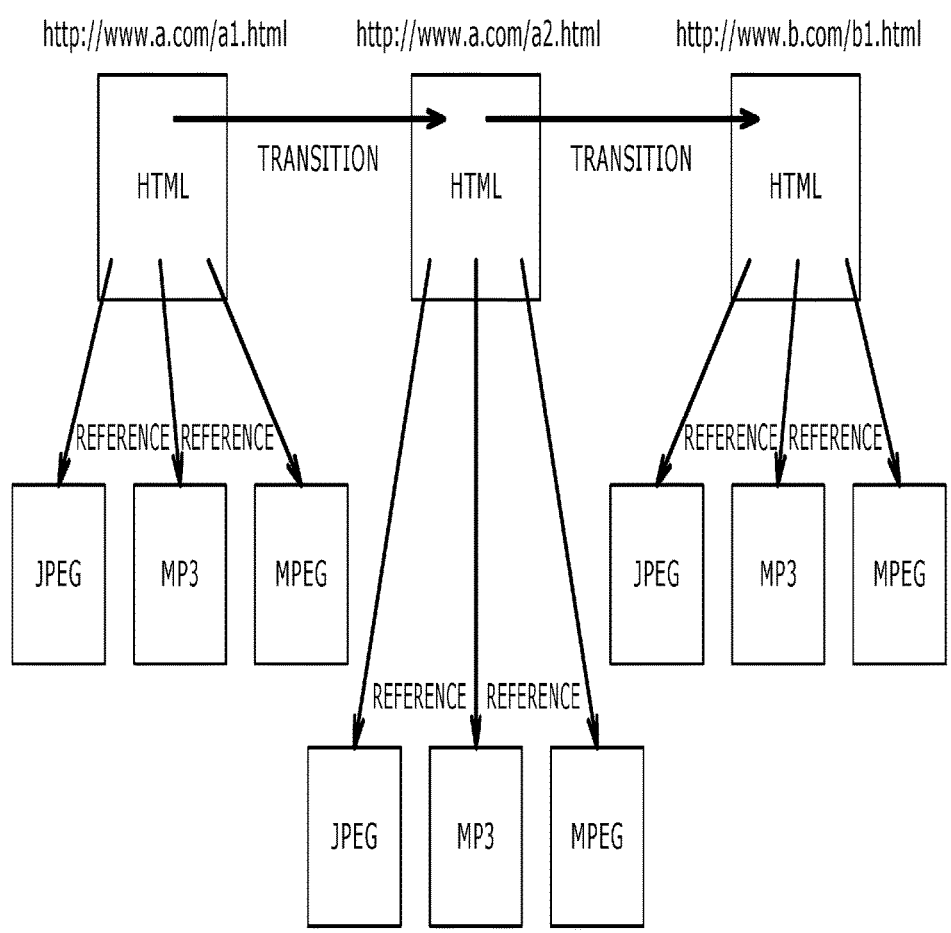
FIG. 18 is a view showing an example of a case in which a transition is made from a TDO active operation state to a Web active operation state.

FIG. 18 shows an example in which a transition is made from the TDO active operation state to the Web active operation state, that is, the management mode is set from "Broadcast managed" to "Broadcast unmanaged" while events are sequentially fired in the TDO active operation state.

Incidentally, suppose that in a data broadcasting HTML document (TDO), a URL for identifying the HTML document (TDO) to be executed to update the video 42 of TDO content is described in association with an event ID.

Thereby, in response to reception of trigger information whose trigger type is the application event, an HTML document (TDO) "a1.html" for executing an event identified by an event ID included in the trigger information is obtained and executed on the basis of an URL "http://www.a.com/a1.html" described in the data broadcasting HTML document (TDO).

Further, in response to reception of new trigger information whose trigger type is the application event, an HTML document (TDO) "a2.html" for executing an event identified by an event ID included in the trigger information is obtained and executed on the basis of an URL "http://www.a.com/a2.html" described in the data broadcasting HTML document (TDO). Thereby, the display of the video 42 is sequentially updated to video displayed by executing the HTML document (TDO) "a1.html" and to video displayed by executing the HTML document "a2.html."

In addition, suppose that a link destination "http://www.b.com/b1.html" of an HTML document "b1.html"

executed when a user operation of selecting the video of a driver displayed in the video 42 of TDO content (FIG. 3) is performed is described in the data broadcasting HTML document.

When the user operation of selecting the video of the driver displayed in the video 42 (FIG. 3) is performed in the TDO active operation state, a transition is made from the TDO active operation state to the Web active operation state.

In this case, the receiving device 30 in the Web active operation state obtains and executes the HTML documents "b1.html" for a home page from the server 22 not managed on the broadcaster side on the basis of the link destination "http://www.b.com/b1.html."

As shown in FIG. 18, when HTML document to be executed are obtained from the server 12 and executed in the TDO active operation state, for example, the HTML document (a1.html and a2.html in this case) are each obtained from the server 12 managed on the broadcaster side (http://www.a.com/ in this case).

In addition, HTML document to be executed in the Web active operation state (b1.html in this case), for example, are obtained from the server 22 not managed on the broadcaster side (http://www.b.com/ in this case).

As described above, the specific process is also allowed when an HTML document is obtained from the server 12 and executed, and the specific process needs to be prevented from being performed when an HTML document is obtained from a server other than the server 12 and executed.

Accordingly, the receiving device 30 determines whether an HTML document to be executed is obtained from the server 12 according to whether the domain name of the server 12 managed on the broadcaster side coincides with the domain name of a destination from which the HTML document to be executed is obtained.

Incidentally, the receiving device 30 regards the domain name (www.a.com in this case) of a destination from which an HTML document is obtained first in realizing service for data broadcasting, that is, a data broadcasting HTML document (TDO) is obtained as the domain name of the server 12 managed on the broadcaster side, and determines whether an HTML document to be executed is obtained from the server 12.

The receiving device 30 sets the management mode to "Broadcast managed" or "Broadcast unmanaged" on the basis of whether the domain name of an HTML document to which a transition is made is the domain name of the server 12 managed on the broadcaster side.

Then, the receiving device 30 allows the specific process when the management mode is "Broadcast managed" (in the case of the TDO active operation state), and prevents the specific process from being performed when the management mode is "Broadcast unmanaged" (in the case of the Web active operation state).

Incidentally, while the receiving device 30 regards the domain name of a destination from which a data broadcasting HTML document (TDO) is obtained in realizing service for data broadcasting as the domain name of the server 12 managed on the broadcaster side, the receiving device 30 may retain the domain name of a server managed by each broadcaster corresponding to each received channel in advance.

Then, the receiving device 30 may select a domain name corresponding to a received channel from the domain names retained in advance, and regard the domain name as the domain name of the server managed on the broadcaster side.

In addition, for example, while the receiving device 30 uses a domain name to determine whether an HTML document to be executed is obtained from the server 12, any information may be used as long as the information uniquely indicates the server as the obtaining destination. That is, for example, the receiving device 30 can determine whether an HTML document to be executed is obtained from the server 12 using not only the domain name but also a MAC (Media Access Control) address, an IP (Internet Protocol) address, or the like.

It is to be noted that, while it is described above with reference to FIGS. 17 and 18 that the homepage HTML document obtained from the server 22 is an example of an HTML document which is not licensed from the broadcaster, also where a data broadcasting HTML document (NDO) or a data broadcasting HTML document (PDO) is not licensed from the broadcaster, it is processed similarly.

[NDO Content Starting Process]

Next, an NDO content starting process is described with reference to a flow chart of FIG. 19.

In step S31, the controlling section 68 determines based on an operation signal from the operating section 70 or the remote controller 32 whether a starting event of an NDO content is generated. To this starting event of an NDO content, for example, the event D of FIG. 5 which is generated when an independent data broadcasting channel is selected by the user or in a like case corresponds.

For example, if it is determined that the event D of FIG. 5 occurs and a starting event of an NDO content is generated ("YES" in state S31), then the process is advanced to step S32.

In step S32, the controlling section 68 controls the browser 73-1 to access the server 12 corresponding to the URL of the NDO content to be started to obtain a data broadcasting HTML document (NDO). It is to be noted that, since the data broadcasting HTML document (NDO) obtained here is a document licensed from the broadcaster similarly as in the use case of FIG. 5, it is obtained from the server 12 managed by the broadcaster. In this instance, to the data broadcasting HTML document (NDO), "Broadcast Managed" is set as the management mode.

In step S33, the browser 73-1 starts the data broadcasting HTML document (NDO) obtained in step S32 under the control of the controlling section 68. Consequently, the NDO content is started.

Thereafter, the process is returned to step S31 so that the steps beginning with step S31 are repeated.

Figure 19:
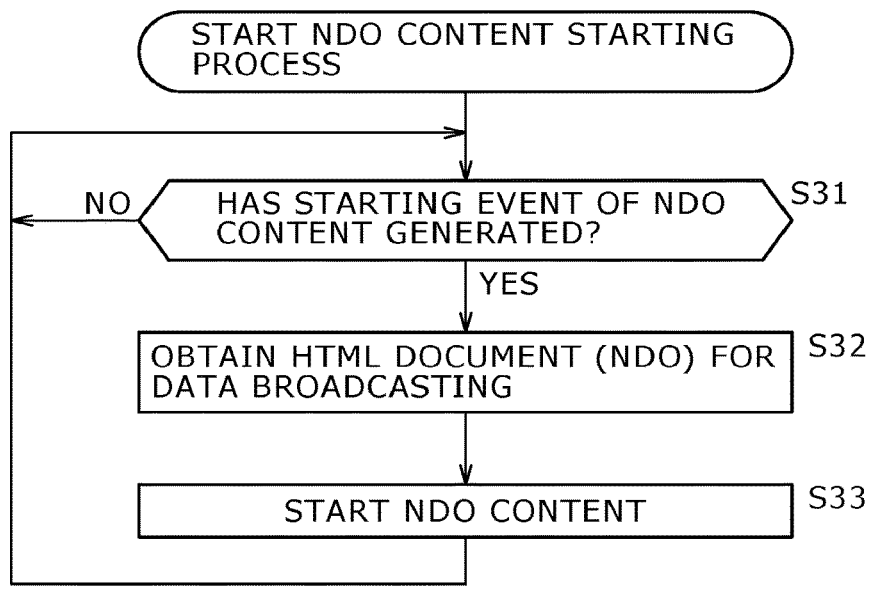
FIG. 19 is a flow chart explaining an NDO content starting process.

It is to be noted that, while, in the description of the example of FIG. 19, it is described that the data broadcasting HTML document (NDO) is a document licensed from the broadcaster in conformity with the use case of FIG. 5, if the data broadcasting HTML document (NDO) does not have a license from the broadcaster, then the data broadcasting HTML document (NDO) is obtained from the server 21, and "Broadcast Unmanaged" is set as the management mode.

The description of the NDO content starting process is ended therewith.

[PDO Content Starting Process]

Next, a PDO content starting process is described with reference to a flow chart of FIG. 20.

In step S51, the controlling section 68 determines based on an operation signal from the operating section 70 or the remote controller 32 whether a starting event of a PDO content is generated. To this stating event, for example, the event C of FIG. 5 which is generated when a PDO content is selected by the user corresponds.

For example, if it is determined that the event C of FIG. 5 occurs and a starting event of a PDO content is generated ("YES" in state S51), then the process is advanced to step S52.

In step S52, the controlling section 68 controls the browser 73-2 to access the server 21 corresponding to the URL of the PDO content to be started to obtain a data broadcasting HTML document (PDO). It is to be noted that, since the data broadcasting HTML document (PDO) obtained here is a document not licensed from the broadcaster similarly as in the use case of FIG. 5, it is obtained from the server 21 which is not managed by the broadcaster. In this case, to the data broadcasting HTML document (PDO), "Broadcast Unmanaged" is set as the management mode.

In step S53, the browser 73-2 starts the data broadcasting HTML document (PDO) obtained in step S52 under the control of the controlling section 68. Consequently, the PDO content is started.

Thereafter, the process is returned to step S51 so that the steps beginning with step S51 are repeated.

Figure 20:
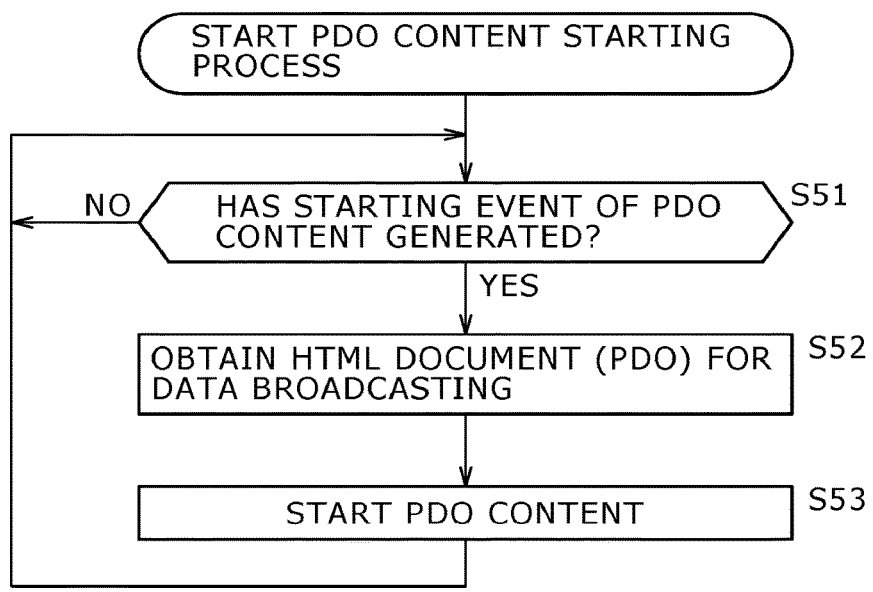
FIG. 20 is a flow chart explaining a PDO content starting process.

It is to be noted that, while, in the description of the example of FIG. 20, it is described that the data broadcasting HTML document (PDO) is a document not licensed from the broadcaster in conformity with the use case of FIG. 5, if the data broadcasting HTML document (PDO) has a license from the broadcaster, then the data broadcasting HTML document (PDO) is obtained from the server 12, and "Broadcast Managed" is set as the management mode.

The description of the PDO content starting process ends therewith.

[Details of Management Mode Setting Process]

Figure 21:
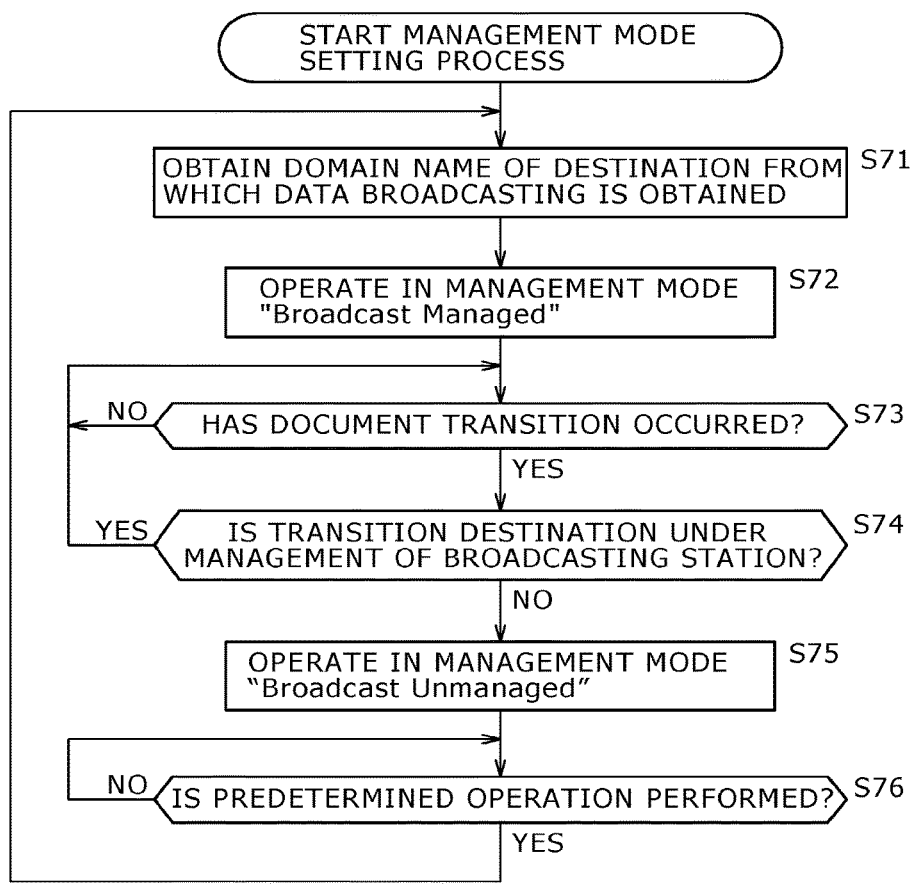
FIG. 21 is a flowchart for explaining a management mode setting process.

A management mode setting process in which the receiving device 30 sets the management mode on the basis of the domain name of a destination from which an HTML document is obtained will next be described with reference to a flowchart of FIG. 21.

This management mode setting process is started when a data broadcasting HTML document (TDO) is started in step S11 in FIG. 14, or when a data broadcasting HTML document (NDO) is started in step S33 in FIG. 19, for example.

In step S71, the controlling section 68 obtains the domain name of a destination from which the started data broadcasting HTML document is obtained.

Specifically, when the started data broadcasting HTML document (TDO) is obtained on the basis of the application URL of trigger information in step S5 or step S14 in FIG. 14, for example, the controlling section 68 obtains the domain name of the destination (server 12) from which the started data broadcasting HTML document (TDO) is obtained on the basis of the application URL of the trigger information.

When the started data broadcasting HTML document (TDO) is read and obtained from the recording section 71 in step S6 in FIG. 14, for example, the controlling section 68 controls the browser 73-1 so as to make the browser 73 obtain the domain name of the server 12 retaining the started data broadcasting HTML document (TDO) from the recording section 71 and supply the domain name of the server 12 to the controlling section 68. The controlling section 68 thereby obtains the domain name.

Incidentally, suppose that when the data broadcasting HTML document (TDO) is recorded in the recording section 71, the domain name of the server 12 retaining the data broadcasting HTML document (TDO) is recorded in association with the data broadcasting HTML document (TDO).

Further, for example, if the data broadcasting HTML document (PDO) to be started is a document obtained based on the URL designated by the channel selected by the user in step S32 of FIG. 19, then the domain name of the obtaining destination (server 12) to be started is obtained.

In step S72, the controlling section 68 controls the browser 73-1 to operate as a management mode "Broadcast Managed" wherein the browser 73-1 can perform the predetermined process. In particular, in the present example, since the data broadcasting HTML document (TDO) and the data broadcasting HTML document (NDO) have been obtained from the server 12 managed by the broadcaster, the controlling section 68 controls execution of the HTML document by the browser 73-1 to allow that the specific process is performed by execution of the HTML document (The controlling section 68 does not limit such a process).

In step S73, the controlling section 68 determines whether a document transition according to an HTML document has occurred on the basis of input trigger information, an operating signal from the operating section 70 or the remote controller 32. The controlling section 68 waits for a document transition to occur, and then advances the process to step S74.

In step S74, the controlling section 68 determines whether the HTML document as transition destination is obtained from the server 12 managed on the broadcaster side on the basis of whether the domain name of a destination from which the HTML document as transition destination is obtained coincides with the domain name already obtained in the process of step S71.

When it is determined in step S74 that the HTML document as transition destination is obtained from the server 12, the process is returned to step S73, and a similar process is thereafter performed with the browser 73-1 operated in the management mode "Broadcast managed."

When it is determined in step S74 that the HTML document as transition destination is not obtained from the server 12, the process is advanced to step S75.

For example, if the event e occurs during display of the UI2 of FIG. 5, then the document transits from the data broadcasting HTML document (TDO) to the data broadcasting HTML document (PDO). In this case, the data broadcasting HTML document (PDO) of the transition destination is obtained from the server 21 similarly, and since the domain does not coincide, the determination of "No" is made in the determination process in step S74, and the process is advanced to step S75.

However, for example, if the event g occurs during display of the UI5 of FIG. 5, then the document transits from the data broadcasting HTML document (NDO) to the data broadcasting HTML document (PDO). Also in this case, the data broadcasting HTML document (PDO) of the transition destination is obtained from the server 21, and since the domain name does not coincide, the process is advanced to step S75.

In step S75, where the controlling section 68 controls the browser 73 so as to make the browser 73-1 or the browser 73-2 operate in the management mode "Broadcast unmanaged" in which the specific process cannot be performed. That is, the controlling section 68 controls the execution of the HTML document in the browser 73-1 or the browser 73-2 so as not to allow the specific process to be performed by executing the HTML document (limits performing the specific process).

In this case, for example, the browser 73-2 cannot perform the specific process, and executes a data broadcasting HTML document (PDO) as HTML document as transition destination.

Incidentally, suppose that the data broadcasting HTML document (TDO) is ended on the basis of trigger information whose trigger type is the application end, for example, while the data broadcasting HTML document (PDO) for the home page is executed.

Thereafter, in step S76, the controlling section 68 determines based on an operation signal from the operating section 70 or the remote controller 32 whether or not a predetermined operation such as, for example, the event B of FIG. 5 is performed. Then, after the controlling section 68 waits that the predetermined operation is performed, the process is returned to step S71. Thereafter, a similar process is thereafter repeated. Specifically, for example, the controlling section 68 determines whether trigger information for starting a new data broadcasting HTML document (TDO) is input, and waits to determine that the trigger signal is input. The controlling section 68 then returns the process to step S71, and a similar process is thereafter repeated.

As described above, in the management mode transition process, the management mode is set at "Broadcast managed" when the domain name of a data broadcasting HTML document and the domain name of an HTML document as transition destination coincide with each other, and the management mode is set at "Broadcast unmanaged" when the domain name of a data broadcasting HTML document and the domain name of an HTML document as transition destination do not coincide with each other.

When the management mode is set at "Broadcast managed," for example a process of reading area information of the user which area information is already stored in the receiving device 30 or the like is allowed to be performed by executing a data broadcasting HTML document (TDO) or a data broadcasting HTML document (NDO). When the management mode is set at "Broadcast unmanaged," the reading process or the like is prevented from being performed by executing a data broadcasting HTML document (PDO) or an HTML document for a home page as a process unintended by the user.

Thus, the process unintended by the user can be prevented from being performed even when a data broadcasting HTML document (PDO) or an HTML document for a home page created by a malicious third party is obtained and executed.

2. Example of Modification

In the present embodiment, as shown in FIG. 17, the operation states of a data broadcasting HTML document (TDO) are four operations states, that is, the TDO stop operation state, the TDO pre-cache ready operation state, the TDO active state, and the Web active state. However, as shown in FIG. 22, for example, the operation states of a data broadcasting HTML document (TDO) can be five operation states including a newly added TDO suspend operation state (corresponding to TDO Suspend in FIG. 22).

In this case, as shown in FIG. 23, suspend is newly added as the trigger type of trigger information, and the trigger type of trigger information indicates one of the application start, the application end, the application event, the pre-cache, and the suspend.

Figure 22:
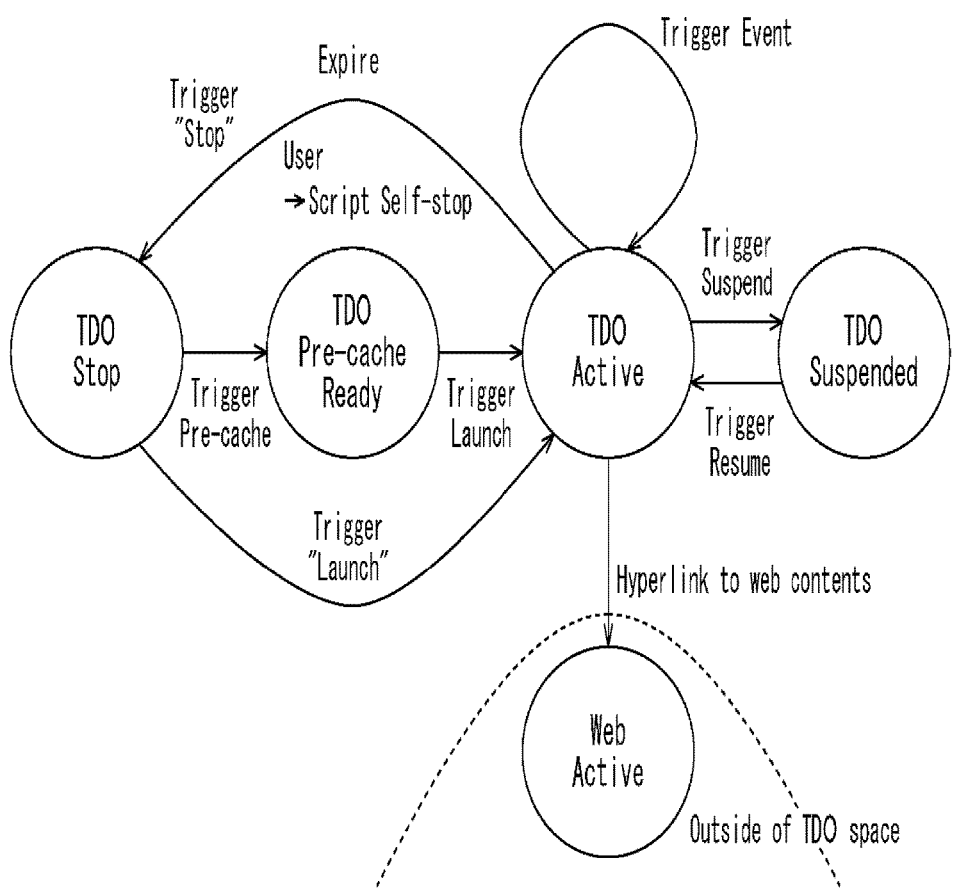
FIG. 22 is another view showing an example of a life cycle of a data broadcasting HTML document (TDO)

In FIG. 22, when trigger information whose trigger type is the suspend is received in the TDO active operation state, the operation state of a corresponding data broadcasting HTML document (TDO) makes a transition to the TDO suspend operation state. In this case, because the operation state of a corresponding data broadcasting application makes a transition to the TDO suspend operation state, another data broadcasting HTML document (TDO) can be set in the TDO active operation state and executed.

When trigger information whose trigger type is the application start is received in the TDO suspend operation state, the corresponding data broadcasting HTML document (TDO) makes a transition to the TDO active operation state. Thereby, an event can be fired in the data broadcasting HTML document (TDO). At this time, the other data broadcasting HTML document (TDO) makes a transition from the TDO active operation state to the TDO suspend operation state.

It is to be noted that, while, in the foregoing description, it is described that a data broadcasting HTML document is obtained by accessing a server connected to the Internet 20, in the present embodiment, a data broadcasting HTML document may be transmitted utilizing a predetermined waveband for broadcasting data broadcasting contents provided in a broadcasting waveband for a digital television broadcasting signal. For example, a data broadcasting HTML document can be transmitted utilizing a session of the FLUTE (File Delivery over Unidirectional Transport) prescribed as RFC3926. In this case, the determination of whether or not the data broadcasting HTML document of the transition destination when a document transition occurs is under the management of the broadcaster (step S74 of FIG. 21) is performed, for example, using channel information of the FLUTE session.

On the other hand, when it is possible to obtain a data broadcasting HTML document from both of communication and broadcasting, the data broadcasting HTML document is obtained from one of the communication and the broadcasting in response to priority degrees of obtaining destinations determined in advance.

Further, while, in the foregoing description, it is described for the convenience of description that a data broadcasting HTML document having a license from the broadcaster is stored in the server 12 managed by the broadcaster side while a data broadcasting HTML document which does not have a license from the broadcaster is stored in the server 21 which is managed by some other operator side, a data broadcasting HTML document which has a license may be stored in the server 21 which is managed by another operator side such as a content producer. In other words, in the server 21, one or both of data broadcasting HTML documents having a license and data broadcasting HTML documents having no license can be stored. On the other hand, in the server 12, only data broadcasting HTML documents having a license can be stored.

[Example of Configuration of Computer]

The series of processes described above can be carried out not only by hardware but also by software. When the series of processes is to be carried out by software, a program constituting the software is installed from a program recording medium onto a computer incorporated in dedicated hardware or for example a general-purpose personal computer that can perform various functions by installing various programs thereon.

Figure 24:
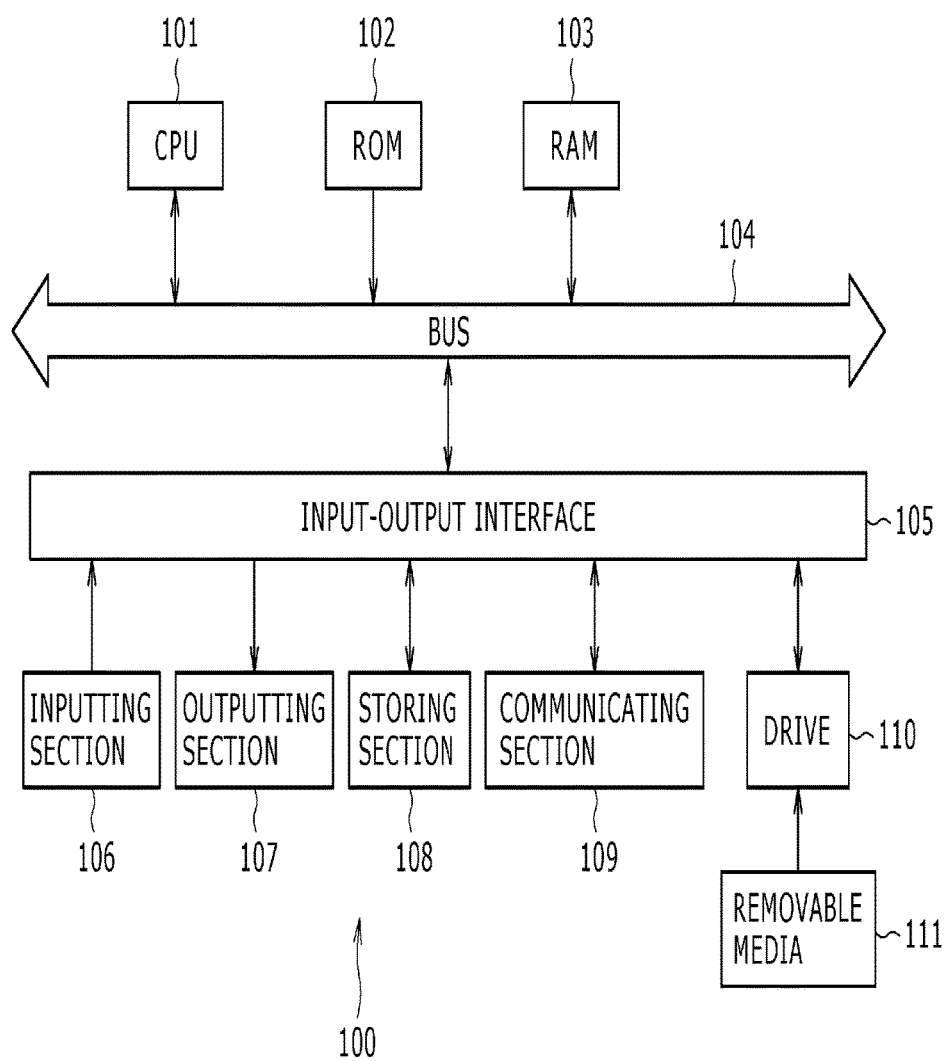
FIG. 24 is a view showing an example of configuration of a computer.

FIG. 24 is a block diagram showing an example of hardware configuration of a computer performing the series of processes described above by a program.

In this computer 100, a CPU (Central Processing Unit) 101, a ROM (Read Only Memory) 102, and a RAM (Random Access Memory) 103 are interconnected by a bus 104.

The bus 104 is further connected with an input-output interface 105. The input-output interface 105 is connected with an inputting section 106 formed by a keyboard, a mouse, a microphone and the like, an outputting section 107 formed by a display, a speaker and the like, a storing section 108 formed by a hard disk, a nonvolatile memory and the like, a communicating section 109 formed by a network interface and the like, and a drive 110 for driving removable media 111 such as a magnetic disk, an optical disk, a magneto-optical disk, a semiconductor memory and the like.

In the computer configured as described above, the CPU 101 for example loads a program stored in the storage section 108 into the RAM 103 via the input-output interface 105 and the bus 104, and then executes the program. Thereby the series of processes described above is performed.

It is to be noted that the program executed by the computer may be a program in which processing is performed in time series in the order described in the present specification or may be a program in which processing is performed in parallel or in necessary timing such as at a time of a call being made, for example.

In addition, the program may be processed by one computer, or may be subjected to distributed processing by a plurality of computers. Further, the program may be transferred to a remote computer and executed by the remote computer.

In addition, in the present specification, a system refers to an apparatus as a whole formed by a plurality of devices.

It is to be noted that embodiments of the present technology are not limited to the foregoing embodiments, and that various changes can be made without departing from the spirit of the present technology.

Further, the present technology can be configured also in the following manner.

[1]

A receiving device for receiving an AV content broadcast by a broadcasting wave, including:

an obtaining section adapted to obtain a description document described in a predetermined computer language for displaying another content different from the AV content;

a determining section adapted to determine whether the obtained description document is managed by a broadcaster which broadcasts the AV content or is managed by a different operator other than the broadcaster; and a controlling section adapted to control execution of the obtained description document in response to a result of the determination by the determining section.

[2]

The receiving device according to [1], further including:

a trigger detecting section adapted to detect trigger information relating to control of the description document transmitted together with the AV content and executed in an interlocked relationship with the progress of the AV content; and wherein the obtaining section obtains the description document from an information processing device managed by the broadcaster based on the detected trigger information, and the determining section determines that the description document obtained from the information processing device is managed by the broadcaster.

[3]

The receiving device according to [1], wherein the obtaining section obtains, when a description document which can be executed solely without interlocking with the AV content, the description document from an information processing device managed by the broadcaster, and the determining section determines that the description document obtained from the information processing device is managed by the broadcaster.

[4]

The receiving device according to [1], wherein the obtaining section obtains, when a description document which can be executed only by a specific application program, the description document from a different information processing device managed by the different operator, and the determining section determines that the description document obtained from the different information processing device is managed by the different operator.

[5]

The receiving device according to [1], further including:

an executing section adapted to execute the obtained description document, and the controlling section controls, when it is determined that the description document is managed by the broadcaster, the executing section to operate in a first management mode in which the executing section can perform a specific process determined in advance, but controls, if it is determined that the description document is managed by the different operator, the executing section to operate in a second management mode in which the executing section cannot perform the specific process.

[6]

The receiving device according to [5], wherein the determining section determines, when the executing section operates in the first management mode, every time the description document is obtained, whether the obtained description document is managed by the broadcaster or the different operator, and the controlling section controls, when it is determined that the description document is managed by the different operator, the executing section, which is operating in the first management mode, to operate in the second management mode.

[7]

The receiving device according to [5], wherein the controlling section controls, when a predetermined operation is performed while the executing section is operating in the second management mode, the executing section, which is operating in the second management mode, to operate in the first management mode.

[8]

The receiving device according to [1], wherein the obtaining section obtains the description document transmitted utilizing a predetermined broadcasting waveband of a digital television broadcasting signal of the broadcasting wave.

[9]

A receiving method by a receiving device, including:

obtaining a description document described in a predetermined computer language for displaying another content different from an AV content broadcast by a broadcasting wave;

determining whether the obtained description document is managed by a broadcaster which broadcasts the AV content or is managed by a different operator other than the broadcaster; and controlling execution of the obtained description document in response to a result of the determination.

[10]

A program for controlling a receiving device and causing a computer of the receiving device to execute a process including:

obtaining a description document described in a predetermined computer language for displaying another content different from an AV content broadcast by a broadcasting wave;

determining whether the obtained description document is managed by a broadcaster which broadcasts the AV content or is managed by a different operator other than the broadcaster; and controlling execution of the obtained description document in response to a result of the determination.

What is claimed is:

1. A receiving device for receiving an audio/video (AV) content broadcast, comprising:
    processing circuitry configured to:
        obtain from an information processing device, using a first uniform resource identifier (URI), a description document described in a predetermined computer language for displaying another content different from the AV content;
        execute the description document;
        determine, based on the first URI, whether the information processing device is associated with a broadcaster which broadcasts the AV content;
        control execution of the description document according to a mode that is set based on the determination of whether the information processing device is associated with the broadcaster;
        process a transition from the description document to a further description document; and
        change between first and second modes based on a second URI of an information processing device from which the further description document is to be obtained,
    wherein the processing circuitry is configured to
        control the execution of the description document in the first mode in which the description document can perform a process when the information processing device is determined to be associated with the broadcaster, and
        control the execution of the description document in the second mode in which the description document cannot perform the process when the information processing device is determined not to be associated with the broadcaster.

2. The receiving device according to claim 1, wherein the processing circuitry is configured to detect trigger information transmitted with the AV content, the trigger information relating to control of the description document in an interlocked relationship with the progress of the AV content and including the URI.

3. The receiving device according to claim 1, wherein the description document can be executed independently of the progress of the AV content.

4. The receiving device according to claim 1, wherein the description document is executed by an application program.

5. The receiving device according to claim 1, wherein the processing circuitry is configured to change the mode from the second mode to the first mode if a predetermined operation is performed.

6. The receiving device according to claim 1, wherein the processing circuitry is configured to obtain the description document transmitted utilizing a predetermined broadcasting waveband of a digital television broadcasting signal.

7. The receiving device according to claim 1, wherein the processing circuitry is configured to obtain the description document via a communication network.

8. The receiving device according to claim 1, comprising a receiver configured to receive the AV content broadcast.

9. The receiving device according to claim 1, wherein the processing circuitry is configured to allow the description document to perform one or more of a channel selecting operation, a recording operation, and a bookmarking operation.

10. The receiving device according to claim 1, wherein the processing circuitry is configured to determine whether the information processing device is associated with the broadcaster which broadcasts the AV content based on a domain name included in the URI.

11. A receiving method by a receiving device, comprising:
    obtaining, from an information processing device, using a first uniform resource identifier (URI), a description document described in a predetermined computer language for displaying another content different from the AV content;
    executing the description document;
    determining, based on the first URI, whether the information processing device is associated with a broadcaster which broadcasts the AV content;
    controlling execution of the description document according to a mode that is set based on the determination of whether the information processing device is associated with the broadcaster;
    processing a transition from the description document to a further description document; and
    changing between first and second modes based on a second URI of an information processing device from which the further description document is to be obtained,
    wherein the controlling includes
        controlling the execution of the description document in the first mode in which the description document can perform a process when the information processing device is determined to be associated with the broadcaster, and
        controlling the execution of the description document in the second mode in which the description document cannot perform the process when the information processing device is determined not to be associated with the broadcaster.

12. The method according to claim 11, comprising detecting trigger information transmitted with the AV content, the trigger information relating to control of the description document in an interlocked relationship with the progress of the AV content and including the URI.

13. The method according to claim 11, comprising changing the mode from the second mode to the first mode if a predetermined operation is performed.

14. The method according to claim 11, comprising obtaining the description document transmitted utilizing a predetermined broadcasting waveband of a digital television broadcasting signal.

15. The method according to claim 11, comprising obtaining the description document via a communication network.

16. The method according to claim 11, wherein the description document is allowed to perform one or more of a channel selecting operation, a recording operation, and a bookmarking operation.

17. The method according to claim 11, wherein determining whether the information processing device is associated with the broadcaster which broadcasts the AV content is based on a domain name included in the URI.

18. A non-transitory computer-readable storage medium storing a program for controlling a receiving device and causing processing circuitry of the receiving device to execute a process comprising:
- obtaining, from an information processing device, using a first uniform resource identifier (URI), a description document described in a predetermined computer language for displaying another content different from the AV content;
- executing the description document;
- determining, based on the first URI, whether the information processing device is associated with a broadcaster which broadcasts the AV content;
- controlling execution of the description document according to a mode that is set based on the determination of whether the information processing device is associated with the broadcaster;
- processing a transition from the description document to a further description document; and
- changing between first and second modes based on a second URI of an information processing device from which the further description document is to be obtained,
- wherein the controlling includes
  - controlling the execution of the description document in the first mode in which the description document can perform a process when the information processing device is determined to be associated with the broadcaster, and
- controlling the execution of the description document in the second mode in which the description document cannot perform the process when the information processing device is determined not to be associated with the broadcaster.

* * * * *